(12) United States Patent
Kwon et al.

(10) Patent No.: US 9,501,424 B2
(45) Date of Patent: Nov. 22, 2016

(54) MEMORY MAPPING METHOD OF NONVOLATILE MEMORY SYSTEM AND SYSTEM FOR PROVIDING THE MEMORY MAPPING METHOD

(71) Applicant: Samsung Electronics Co., Ltd., Suwon-si (KR)

(72) Inventors: Oh-seong Kwon, Hwaseong-si (KR); Hwan-soo Han, Seoul (KR); Jung-sik Choi, Suwon-si (KR); Sun-young Lim, Hwaseong-si (KR)

(73) Assignees: SAMSUNG ELECTRONICS CO., LTD., Samsung-ro, Yeongtong-gu, Suwon-si, Gyeonggi-do (KR); SUNGKYUNKWAN UNIVERSITY RESEARCH & BUSINESS F, Seobu-ro, Jangan-gu, Suwon-si, Gyeonggi-do (KR)

( * ) Notice: Subject to any disclaimer, the term of this patent is extended or adjusted under 35 U.S.C. 154(b) by 71 days.

(21) Appl. No.: 14/507,833

(22) Filed: Oct. 7, 2014

(65) Prior Publication Data

US 2015/0193354 A1    Jul. 9, 2015

(30) Foreign Application Priority Data

Jan. 7, 2014    (KR) ........................ 10-2014-0002083

(51) Int. Cl.
    *G06F 12/00*    (2006.01)
    *G06F 12/10*    (2016.01)
    *G06F 12/02*    (2006.01)

(52) U.S. Cl.
    CPC ....... *G06F 12/1027* (2013.01); *G06F 12/0246* (2013.01); *G06F 2212/1041* (2013.01); *G06F 2212/202* (2013.01); *G06F 2212/305* (2013.01)

(58) Field of Classification Search
    None
    See application file for complete search history.

(56) References Cited

U.S. PATENT DOCUMENTS

| | | | |
|---|---|---|---|
| 5,787,445 A * | 7/1998 | Daberko | ............... G06F 3/0626 |
| 7,069,389 B2 | 6/2006 | Cohen | |
| 7,647,471 B2 | 1/2010 | Hastings et al. | |
| 7,867,853 B2 | 1/2011 | Mine | |
| 8,032,723 B2 | 10/2011 | Sechrest et al. | |
| 8,255,645 B2 | 8/2012 | Ergan et al. | |
| 8,321,460 B2 | 11/2012 | Munday | |
| 8,370,603 B2 | 2/2013 | Toelkes et al. | |

(Continued)

FOREIGN PATENT DOCUMENTS

| KR | 10-2011-0098003 | 7/2011 |
|---|---|---|
| KR | 10-2013-0030241 A | 3/2013 |

OTHER PUBLICATIONS

Agarwal and Malhotra, "Device drivers in user space" Nov. 19, 2012. as retrieved from http://www.embedded.com/design/operating-systems/4401769/Device-drivers-in-user-space.*

(Continued)

*Primary Examiner* — Daniel Tsui
(74) *Attorney, Agent, or Firm* — Muir Patent Law, PLLC

(57) ABSTRACT

Provided is a memory mapping method, and particularly provided is a nonvolatile main memory mapping method for managing a nonvolatile main memory. The nonvolatile memory mapping method includes: performing a system call in order to access a file page that is required to operate a process stored in a kernel area of a nonvolatile main memory, wherein both the file page and process are stored in the kernel area of the nonvolatile main memory; and mapping a physical address of the file page to a virtual address of a user area of the nonvolatile main memory.

16 Claims, 18 Drawing Sheets

(56) References Cited

U.S. PATENT DOCUMENTS

| | | | |
|---|---|---|---|
| 8,386,749 B2 | 2/2013 | Dannowski et al. | |
| 8,515,336 B2 | 8/2013 | Collins et al. | |
| 8,521,963 B1 | 8/2013 | Miao et al. | |
| 2009/0193185 A1* | 7/2009 | Cheng | G06F 12/0292 711/104 |
| 2010/0058046 A1* | 3/2010 | John | G06F 12/1408 713/2 |
| 2013/0073788 A1 | 3/2013 | Post et al. | |
| 2013/0132690 A1 | 5/2013 | Epstein | |
| 2013/0212318 A1 | 8/2013 | Toelkes et al. | |

OTHER PUBLICATIONS

Kerrisk, Michael, "Linux manual page." HTML rendering created Aug. 8, 2013, from http://man7.org/linux/man-pages/man2/mmap.2.html.

Kerrisk, Michael,"linux-2." HTML rendering created Aug. 8, 2013, from http://man7.org/linux/man-pages/man2/mmap.2.html.

Wu et al., "SCMFS: A File System for Storage Class Memory." SC11, Nov. 12-18, 2011.

Pease et al, "Storage Class Memory Technology & Use." IBM, 2009.

Wu, Xiaojian, "Storage Systems for Non-Volatile Memory Devices." Dissertation, Texas A&M University, Aug. 2011.

Talluri, et al. "Surpassing the TLB Performance of Superpages with Less Operating System Support." Proceedings of the Sixth International Conference on Architectural Support for Programming Languages and Operating Systems (ASPLOS VI), Oct. 1994, pp. 1-14.

Lichota, Krzysztof, "VFS and Filesystems in Linux."

* cited by examiner

MEMORY MAPPING METHOD OF NONVOLATILE MEMORY SYSTEM AND SYSTEM FOR PROVIDING THE MEMORY MAPPING METHOD

CROSS-REFERENCE TO RELATED APPLICATIONS

This application claims the benefit of Korean Patent Application No. 10-2014-0002083, filed on Jan. 7, 2014, in the Korean Intellectual Property Office, the disclosure of which is incorporated herein in its entirety by reference.

BACKGROUND

The disclosed embodiments relate to a memory mapping method, and more particularly, to a memory mapping method of a nonvolatile memory system and a system for providing the memory mapping method.

A nonvolatile main memory refers to a main memory that retains stored data even when not powered. A flash memory that is a nonvolatile main memory is a memory that may electrically write or erase data, and examples of the flash memory include a NAND flash memory. Studies have been conducted on such nonvolatile memory devices. As devices having performance similar to that of dynamic random-access memories (DRAMs) such as spin-transfer torque magnetoresistive random-access memories (STTM-RAMs) have been studied, the possibility that main memories have nonvolatile characteristics has increased.

Optimization for the performance of a file system has been performed on the assumption that the file system is maintained in a secondary storage apparatus. However, because a file system may now be maintained using a nonvolatile main memory, it is useful to study new optimization for a file system based on a nonvolatile main memory which is different from an existing type.

SUMMARY

The disclosed embodiments relate to a memory management method of an operating system for a nonvolatile main memory system, and provide a memory mapping method that enables an application program to more quickly access a file through memory mapping.

According to an aspect of the inventive concept, there is provided a nonvolatile memory mapping method including: performing a system call in order to access a file page that is required to operate a process stored in a kernel area of a nonvolatile main memory, wherein both the file page and process are stored in the kernel area of the nonvolatile main memory; and mapping a physical address of the file page to a virtual address of a user area of the nonvolatile main memory.

The performing of the system call may include performing a read/write system call, and the mapping may include mapping the physical address of the file page to a virtual address of a library buffer in a space of the user area, wherein the nonvolatile memory mapping method further includes copying the file page to a user buffer in a space of the user area.

The mapping may include, when a sequential access command is generated in the file page that is stored in the nonvolatile main memory, increasing a size of the file page to be mapped.

The mapping may include, when a random access command is generated in the file page that is stored in the nonvolatile main memory, initializing the size of the file page to be mapped.

The nonvolatile memory mapping method may further include populating the file page that is necessary for mapping into a space of the kernel area of the nonvolatile main memory, wherein the populating is performed by a swap device that is provided in a secondary storage apparatus.

The populating may include: detecting a file offset that is necessary to operate the process; selecting a file page that is necessary to be populated with a first priority into a space of the kernel area of the nonvolatile main memory based on the detected file offset; and selectively populating the necessary file page with the first priority.

The selecting of the necessary file page may further include: selecting a file page that is necessary to be populated with a next priority into a space of the kernel area of the nonvolatile main memory based on the detected file offset; and populating the necessary file page with the next priority in asynchronization with the selective populating.

The nonvolatile memory mapping method may further include: receiving, from a nonvolatile memory system, mapping table information that is updated by a processor; and updating a mapping table in a translation lookaside buffer (TLB) based on the updated mapping table information, wherein the updating is performed by the processor.

The mapping may include: before allocating a virtual area to the nonvolatile main memory, detecting characteristics of the virtual area; determining whether the virtual area that is already allocated is to be re-used based on the detected characteristics; and when it is determined that the virtual area may be re-used, storing a memory virtual address of a file system or the process in the virtual area.

The mapping may include: detecting a file offset in a file write step; determining whether a file page is to be newly allocated based on a result of the detecting the file offset; connecting the newly allocated file page to an existing file; and mapping the newly allocated file page to a virtual area.

According to another aspect of the inventive concept, there is provided a system including: a nonvolatile main memory including a file system in a kernel area of the nonvolatile main memory; a secondary storage apparatus including a swap device in which a file page is stored; and a processor including a population control unit that controls a file page to be populated, the file page being necessary to operate a process.

The nonvolatile main memory may include any one of a spin-transfer torque magnetoresistive random-access memory (STT-MRAM), a resistance random-access memory (ReRAM), a magnetoresistive random-access memory (MRAM), and a ferroelectric random-access memory (FeRAM).

The secondary storage apparatus may be realized as any one of a STT-MRAM, a ReRAM, a MRAM, and a FeRAM.

The population control unit may detect a file offset that is necessary to operate a program and selectively populates a file page whose offset has a first priority.

The population control unit may detect the file offset that is necessary to operate the program and controls a file page whose offset has a next priority to be populated in asynchronization with the selective populating.

According to another aspect of the inventive concept, a nonvolatile memory mapping method includes: performing a system call in order to access a file page that is used to operate a process stored in a kernel area of a nonvolatile main memory, wherein both the file page and process are stored in the kernel area of the nonvolatile main memory; mapping a physical address of the file page to a virtual address of a user area of the nonvolatile main memory; receiving, from a nonvolatile memory system, mapping table information that is updated by a processor; and updating a mapping table in a translation lookaside buffer (TLB) based on the updated mapping table information, wherein the updating is performed by the processor.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
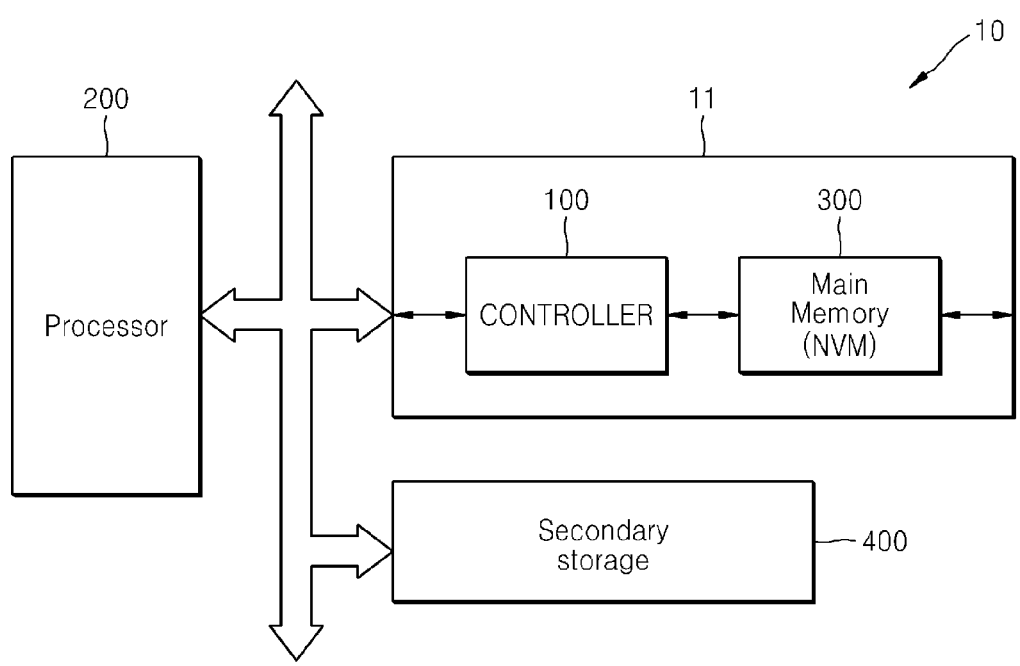
FIG. 1 is a block diagram illustrating a system according to an embodiment of the inventive concept.

As used herein, the term "and/or" includes any and all combinations of one or more of the associated listed items. Expressions such as "at least one of," when preceding a list of elements, modify the entire list of elements and do not modify the individual elements of the list.

The present disclosure will now be described more fully with reference to the accompanying drawings, in which exemplary embodiments of the inventive concept are shown. The embodiments are provided so that this disclosure will fully convey the scope of the inventive concept to one of ordinary skill in the art. It should be understood, however, that there is no intent to limit exemplary embodiments of the inventive concept to the particular forms disclosed, but conversely, exemplary embodiments of the inventive concept are to cover all modifications, equivalents, and alternatives falling within the spirit and scope of the inventive concept. Like reference numerals denote like elements in the drawings. In the attached drawings, sizes of structures may be exaggerated for clarity.

The terminology used herein is for the purpose of describing exemplary embodiments only and is not intended to be limiting of exemplary embodiments of the inventive concept. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components, and/or groups, but do not preclude the presence or addition of one or more other features, integers, steps, operations, elements, components, and/or groups thereof.

It will be understood that, although the terms first, second, third etc. may be used herein to describe various elements, these elements should not be limited by these terms. Unless the context indicates otherwise, these terms are only used to distinguish one element from another element, for example as a naming convention. Thus, a first element discussed below could be termed a second element, and, similarly, a second element could be termed a first element, without departing from the scope of the inventive concept. Similarly, steps depicted in the figures as occurring in a particular order may actually occur in that order, or may be performed in a different order or simultaneously, unless the context indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, or "contacting" another element, there are no intervening elements present. Other words used to describe the relationship between elements should be interpreted in a like fashion (e.g., "between" versus "directly between," "adjacent" versus "directly adjacent,").

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a system 10 according to an embodiment of the inventive concept.

Referring to FIG. 1, the system 10 includes a processor 200, a memory system 11, and a secondary storage apparatus 400. The system 10 may be included in a terminal such as a computer (e.g., desktop or laptop computer). Also, the system 10 may be a mobile system such as a mobile phone, a smart phone, a personal digital assistant (PDA), a portable multimedia player (PMP), a digital camera, a music player, a portable game console, a navigation system, etc.

The memory system 11 includes a nonvolatile memory controller 100 and at least one nonvolatile main memory 300. The nonvolatile main memory 300 may be a semiconductor flash main memory such as a NAND memory chip or a NOR memory chip. Also, the nonvolatile main memory 300 may be a magnetoresistive random-access memory (MRAM), a resistive RAM (RRAM), a ferroelectric RAM (FRAM), a phase change memory (PCM), or a spin-transfer torque MRAM (STT-MRAM). The nonvolatile main memory 300 may operate as a main memory.

The nonvolatile memory controller 100 may communicate with the processor 200 through a processor channel to receive a command and an address and to transmit/receive data. For example, the memory system 11 may receive a processor chip enable signal from the processor 200, and when the processor chip enable signal is maintained in an active state, the memory system 11 may respond to the processor channel.

The nonvolatile main memory 300 may include at least one nonvolatile memory, and a virtual space of the nonvolatile memory for improving memory use efficiency is divided into a user area and a kernel area. Also, the nonvolatile memory may retain stored data even when not powered due to its nonvolatile characteristics. Accordingly, a plurality of memory spaces may exist in the kernel area of the nonvolatile memory. For example, a page cache may exist. A memory-based file system may reside in a memory space of the kernel area.

A file page, a file system, etc., used (and which may be required) by the processor 200 to execute a program or the like may be loaded in the kernel area, and the nonvolatile memory may retain memory contents even when not powered due to its nonvolatile characteristics.

Data that is stored in the nonvolatile main memory 300 may have a physical address and may be mapped to a virtual address of a virtual address of a virtual area of a process.

Accordingly, even when a computing system is turned off and then is turned on, the data that is stored in the nonvolatile main memory 300 is not deleted, and thus the secondary storage apparatus 400 does not need to load the data onto a memory, thereby increasing a speed at which the processor 200 accesses the data.

Code executed by the processor 200 may be copied to the nonvolatile main memory 300 and data processed by a command may be stored in the nonvolatile main memory 300. The nonvolatile main memory 300 may drive a plurality of software or firmware components. For example, the nonvolatile main memory 300 may drive an operating system (OS), an application, a file system, a memory manager, and input/output (I/O) drivers.

An in-memory file system uses a page as a data storage unit of a file. For high reliability, the page is used as a basic unit for ensuring atomicity and consistency of a file write operation.

The secondary storage apparatus 400 may be a hard disk drive (HDD), and may be a data storage apparatus based on a flash memory. When the secondary storage apparatus 400 is a data storage apparatus based on a flash memory, the secondary storage apparatus 400 may include a flash memory, a controller, and a buffer memory. The secondary storage apparatus 400 may be, for example, a solid state device (SSD), an advanced technology attachment (ATA) bus device, a serial advanced technology attachment (SATA) bus device, a multimedia card device, a secure digital (SD) device, a memory stick device, a hybrid drive device, or a general-purpose serial bus flash device.

The flash memory may be connected to the controller via an address or data bus. The flash memory may be divided into a data area and a meta area. General user data or main data may be stored in the data area, and meta data (for example, mapping information of a flash transition layer (FTL)) used (and that may be necessary) to drive the secondary storage apparatus 400 or the flash memory other than the user data may be stored in the meta area.

The controller may transmit and receive data to and from the flash memory or the buffer memory via the address or data bus. The controller may include a mapping manager including a page map table and the FTL, and a local memory used to drive the mapping manager. The FTL is used to efficiently use the flash memory. The FTL functions to convert a logical address provided by the processor 200 into a physical address that may be used by the flash memory.

The FTL manages such address conversion by using a map table. The map table shows a logical address and a physical address corresponding to the logical address. The map table may have a size that varies according to a mapping unit, and may have various mapping methods. In the case of the page map table, the map table is formed in units of pages, and converts a logical address number (LAN) into a physical page number (PPN).

At least one secondary storage apparatus 400 may include a swap device. The swap device may be a device for swapping a page that is not currently used in order to secure a space of the main memory, and data may be stored in the swap device in units of pages. In this case, when data is stored in units of pages, each page may be referred to as a file page.

In addition, the processor 200 of FIG. 1 controls an overall operation of the system 10. The processor 200 may execute the code that is copied to the nonvolatile main memory 300 and may perform a command corresponding to the code. The processor 200 may execute various computing functions such as specific calculations or tasks. In some embodiments, the processor 200 may be a single core processor, or a multi-core processor. For example, the processor 200 may be a dual core processor, a quad-core processor, or a hexa-core processor.

Also, in some embodiments, the processor 200 may further include a cache memory that is disposed inside or outside the processor 200.

Also, the processor 200 may further include a population control unit that controls population, a translation lookaside buffer (TLB) management unit that manages a TLB for increasing a speed at which the processor 200 accesses a file page, a file offset detection unit that detects a file offset, and a mapping control unit that controls data mapping in a memory. The population control unit may transmit a population signal to the secondary storage apparatus 400 and may control a file page that is stored in the secondary storage apparatus 400 and that should be populated with a first priority into the page cache (e.g., it may be necessary to populate the first page with a first priority into the page cache). Also, the TLB management unit may update a mapping table of the TLB based on the mapping table that is stored in the nonvolatile main memory 300, and thus may reduce the number of TLB misses that occur because there is no desired address in the mapping table of the TLB, thereby increasing a response speed of the computing system.

The OS may control software or hardware resources of the system 10, and may control the processor 200 to execute a program. An application refers to any of various application programs that are executed in the system 10. When a file or data is stored in a storage unit, for example, the nonvolatile main memory 300 or the secondary storage apparatus 400, the file system may organize the file or the data. The file system may provide address information according to a write command or a read command to the secondary storage apparatus 400. The file system may be used according to a specific OS that is executed in the system 10. The memory manager may control a memory access operation that is performed in the nonvolatile main memory 300 or a memory access operation that is performed in the secondary storage apparatus 400. The I/O drivers may transmit information between the system 10 and various peripheral apparatuses or a network (for example, the Internet).

The nonvolatile main memory 300 may include a nonvolatile memory. For example, an MRAM from among nonvolatile memories is a magnetoresistance-based nonvolatile memory. The MRAM is different from a volatile RAM in many aspects. Since the MRAM is nonvolatile, the MRAM may retain memory contents even when the main memory is not powered.

In general, although it is known that a traditional nonvolatile RAM is slower than a volatile RAM, the MRAM has a read and write response time that is similar to a read and write response time of a volatile RAM. Unlike a volatile RAM that stores data as electric charges, the MRAM stores data by using magnetoresistive elements. In general, the magnetoresistive elements include two magnetic layers, and each of the two magnetic layers is magnetized.

The MRAM is a nonvolatile memory that reads and writes data by using a magnetic tunnel junction pattern including two magnetic layers and an insulating film that is disposed between the two magnetic layers. A resistance value of the magnetic tunnel junction pattern varies according to a magnetization direction of each of the magnetic layers. Data may be programmed or deleted by using a difference between such resistance values.

The MRAM using a spin-transfer torque (STT) uses a method that when a spin-polarized current flows in one direction, a magnetization direction of a magnetic layer is changed due to spin transfer of electrons. A magnetization direction of one magnetic layer (pinned layer) may be fixed and a magnetization direction of the other magnetic layer (free layer) may be changed according to a magnetic field that is formed due to program current.

The magnetic field of the program current may cause the magnetization directions of the two magnetic layers to be parallel or anti-parallel to each other. When the magnetization directions are parallel to each other, there is a low ("0") resistance state between the two magnetic layers. When the magnetization directions are anti-parallel to each other, there is a high ("1") resistance state between the two magnetic layers. When the magnetization direction of the free layer is switched to have a resultant high or low resistance state between the magnetic layers, the MRAM provides write and read operations.

Although the MRAM has nonvolatility and provides a fast response time, an MRAM cell has a scaling limitation and is sensitive to write disturbance. The program current that is applied to switch a high or low resistance state between the magnetic layers is typically high. Accordingly, when a plurality of cells are arranged in a MRAM array, the program current applied to one memory cell changes a field of a free layer of an adjacent cell. Such write disturbance may be avoided by using a STT.

A STT-MRAM may generally include a magnetic tunnel junction (MTJ) device. The MTJ device is a magnetoresistive data storage device including two magnetic layers (a pinned layer and a free layer) and an insulating layer that is disposed between the magnetic layers.

Program current generally flows through the MTJ device. The pinned layer spin-polarizes electrons of the program current, and when the spin-polarized electrons pass through the MTJ device, a torque is generated. The spin-polarized electrons interact with the free layer by applying the torque to the free layer.

When the torque of the spin-polarized electrons that pass through the MTJ device is greater than a critical switching current density, the torque applied due to the spin-polarized electrons is sufficient to switch a magnetization direction of the free layer. Accordingly, the magnetization direction of the free layer may be parallel or anti-parallel to a magnetization direction of the pinned layer, and a resistance state in the MTJ device is changed.

The STT-MRAM does not need an external magnetic field for switching the free layer in a magnetoresistive device due to the spin-polarized electrons. Also, as a cell size decreases and program current decreases, scaling is improved and write disturbance is avoided. In addition, the STT-MRAM has a high tunnel magnetoresistance ratio, a high ratio between high and low resistance states, and thus improves a read operation in a magnetic domain.

The MRAM is a memory having low cost and high capacity characteristics like a dynamic random-access memory (DRAM), high operation characteristics like a static random-access memory (SRAM), and nonvolatile characteristics like a flash memory.

The nonvolatile main memory 300 may be realized by using a STT-MRAM. In some embodiments, the nonvolatile main memory 300 may be realized as a resistive random-access memory (ReRAM), a MRAM, a ferroelectric random-access memory (FeRAM), or the like.

Figure 2:
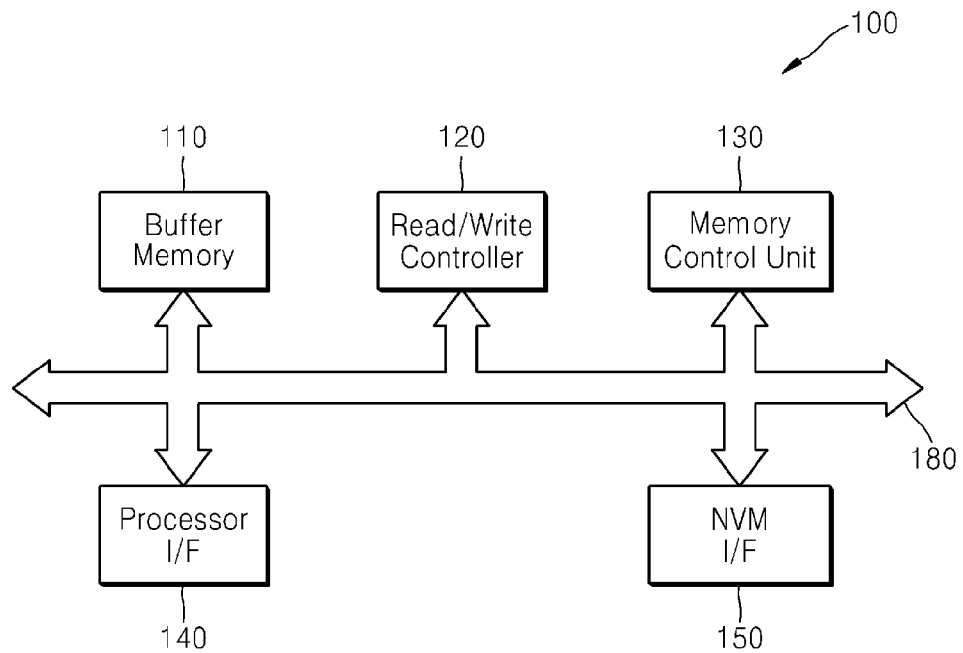
FIG. 2 is a detailed block diagram illustrating a nonvolatile memory controller included in a memory system of FIG. 1, according to an embodiment of the inventive concept.

FIG. 2 is a detailed block diagram illustrating the nonvolatile memory controller 100 included in the memory system 11 of FIG. 1, according to an embodiment of the inventive concept. As shown in FIG. 2, the nonvolatile memory controller 100 may include a buffer memory 110, a read/write controller 120, a memory control unit 130, a processor interface 140, and a nonvolatile main memory interface 150.

The buffer memory 110 may be used as an operation memory of the memory control unit 130. Also, the buffer memory 110 may store a plurality of pieces of data requested to be programmed by the processor 200 in the nonvolatile main memory 300. The buffer memory 110 may be realized, for example, as a DRAM or a SRAM.

The read/write control unit 120 may function to write and read data to and from a memory with a physical address corresponding to a logical address according to the mapping table that is controlled by the processor 200.

The memory control unit 130 may control data to be exchanged between the buffer memory 110, the read/write control unit 120, the processor interface 140, and the nonvolatile main memory interface 150 via a bus 180.

Also, the memory control unit 130 may control a population-related signal, a mapping command-related signal, and a TLB update-related signal of the processor 200 and thus may control smooth data exchange in the nonvolatile memory.

The processor interface 140 may support data exchange between the processor 200 and the nonvolatile memory controller 100 according to a protocol of the processor 200 that is connected to the memory system 11.

The nonvolatile main memory interface 150 may support data exchange between the nonvolatile main memory 300 and the nonvolatile memory controller 100.

Figure 3:
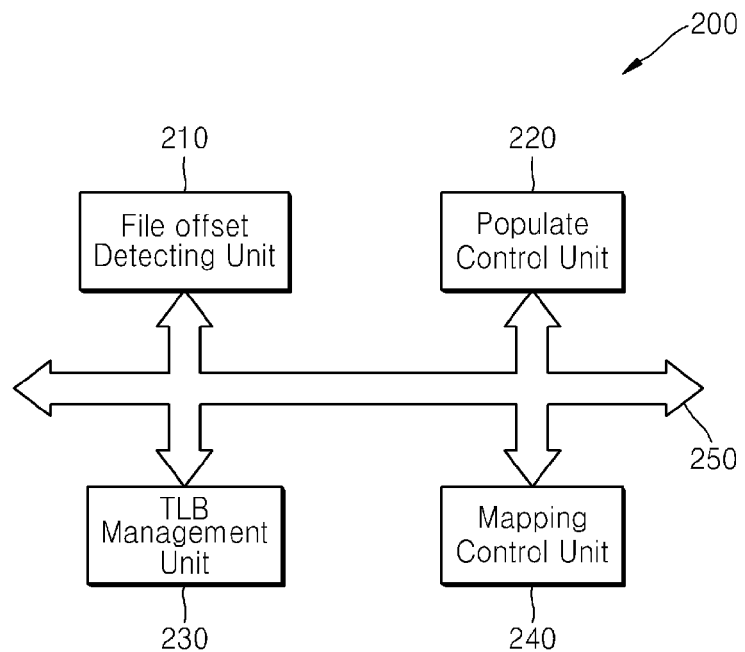
FIG. 3 is a detailed block diagram illustrating a processor of FIG. 1, according to an embodiment of the inventive concept.

FIG. 3 is a detailed block diagram illustrating the processor 200 of FIG. 1, according to an embodiment of the inventive concept.

Referring to FIG. 3, the processor 200 may include a file offset detection unit 210, a population control unit 220, a TLB management unit 230, and a mapping control unit 240.

The file offset detection unit 210 detects a file offset of a file system or a file page which the processor 200 wants to access. A file offset that is a location of a point relevant from a resultant address of a file refers to a value added to a reference address in order to form a second address. The file offset may become criteria for determining an order of files.

File offset data whose file offset is detected may be transmitted to the population control unit 220 and the mapping control unit 240 via a bus 250 in the processor 200.

The population control unit 220 may receive the file offset data of the file offset detection unit 210 and may determine a file page that is used (e.g., may be needed) to operate a program such as the file system based on the file offset data. A file page that is used with a first priority to operate a process and a file page that is used with a next priority to operate the process may be selected based on file offset detection information, and in order to populate the selected file pages into a space of the kernel area of the nonvolatile main memory 300 from the secondary storage apparatus 400, the population control unit 220 may transmit a selective population signal to the secondary storage apparatus 400 and thus may control the file page that is stored in the secondary storage apparatus 400 and is selected to be populated with the first priority into the space of the kernel area of the nonvolatile main memory 300. In one embodiment, a first file page is required to be used with the first priority, and a second file page is required to be used with the second priority in order to operate the process. Also, the population control unit 220 may transmit an asynchronous population signal and thus may control the file page that is stored in the secondary storage apparatus 400 and is selected to be populated with the next priority into the space of the kernel area of the nonvolatile main memory 300, separate from the selective population signal.

In the TLB management unit 230 of FIG. 3, a TLB may correspond to a buffer that stores a virtual address of a file page (data) that is often used by the processor 200 to actually quickly access a memory in the memory system 11 and an entry of a physical address mapped to the virtual address.

When the processor 200 executes repeated mapping in a specific process space by using a system call such as mmap, a physical address corresponding to a virtual address is continuously changed. Accordingly, a desired file page may not exist at the physical address mapped to the virtual address in the TLB, thereby causing TLB misses whenever access to a newly mapped page occurs.

Accordingly, when the processor 200 commands mapping and a physical address corresponding to a virtual address of a file page is changed, the TLB management unit 230 of FIG. 3 may receive updated mapping information from the mapping table in a main memory, may update a virtual address of a file page that is often used based on the updated mapping information and an entry of the mapped physical address, and may store the updated virtual address and the entry in the TLB.

Accordingly, the number of TLB misses may be reduced, and thus a speed at which the processor 200 accesses a file page (data) may be increased.

In relation to the mapping control unit 240, as will be described in detail below, a demand paging method has been used as a memory mapping method in order to improve efficiency of a limited memory space. Accordingly, only when actual access to a page occurs, a necessary page may be loaded in the nonvolatile main memory 300 by using a page fault handler and a page table of a process that requests the access may be updated. However, when a file system or a file page resides in the nonvolatile main memory 300, the demand paging method does not need to be always used. Accordingly, the mapping control unit 240 functions to efficiently control a mapping method when the nonvolatile main memory 300 is provided.

Figure 7:
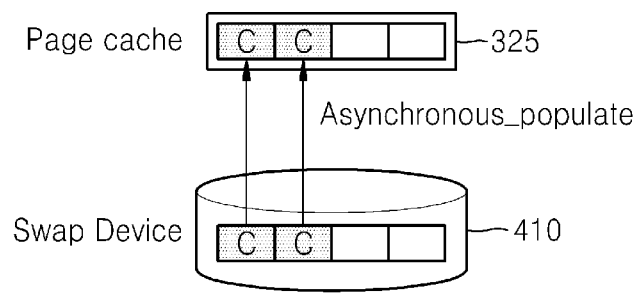
FIG. 7 is a block diagram for explaining asynchronous population according to an embodiment of the inventive concept.
Figure 13:
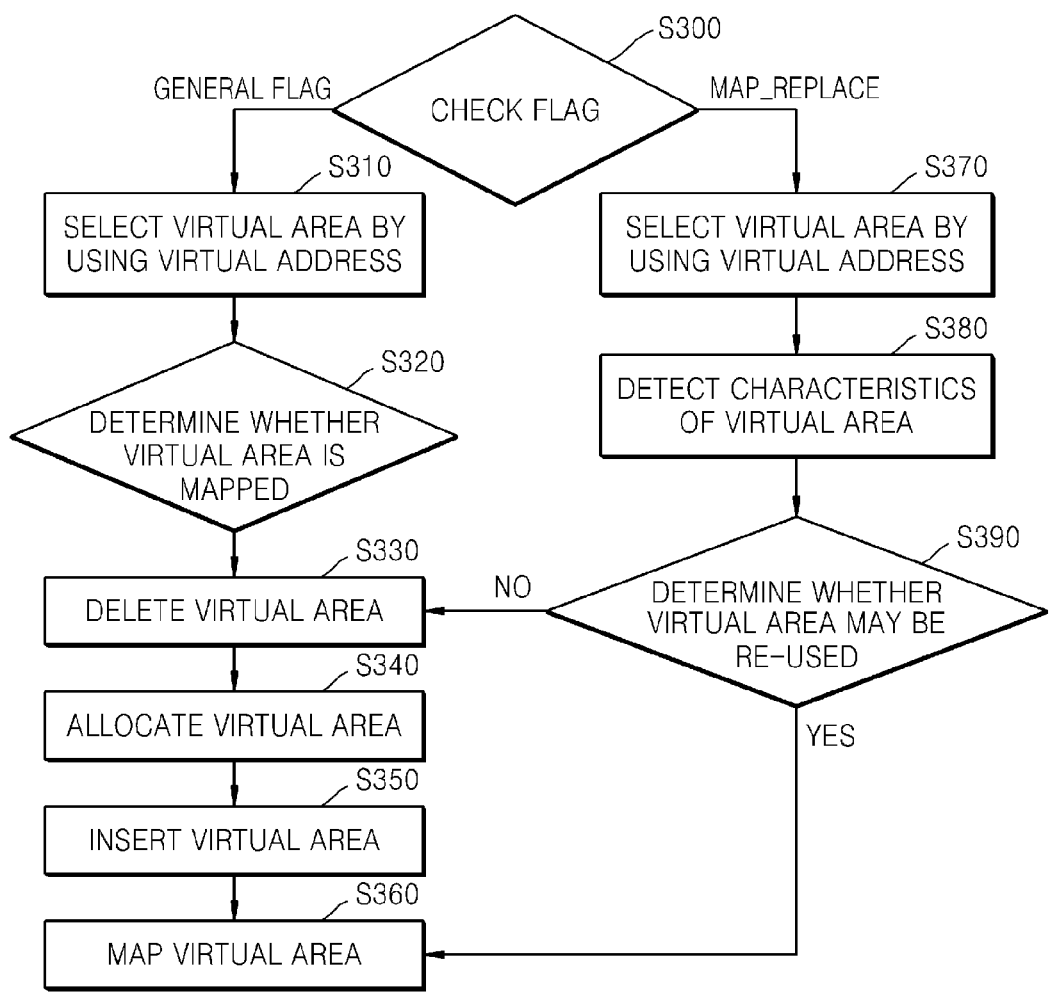
FIG. 13 is a flowchart illustrating a method of re-using a virtual area, according to an embodiment of the inventive concept.
Figure 14:
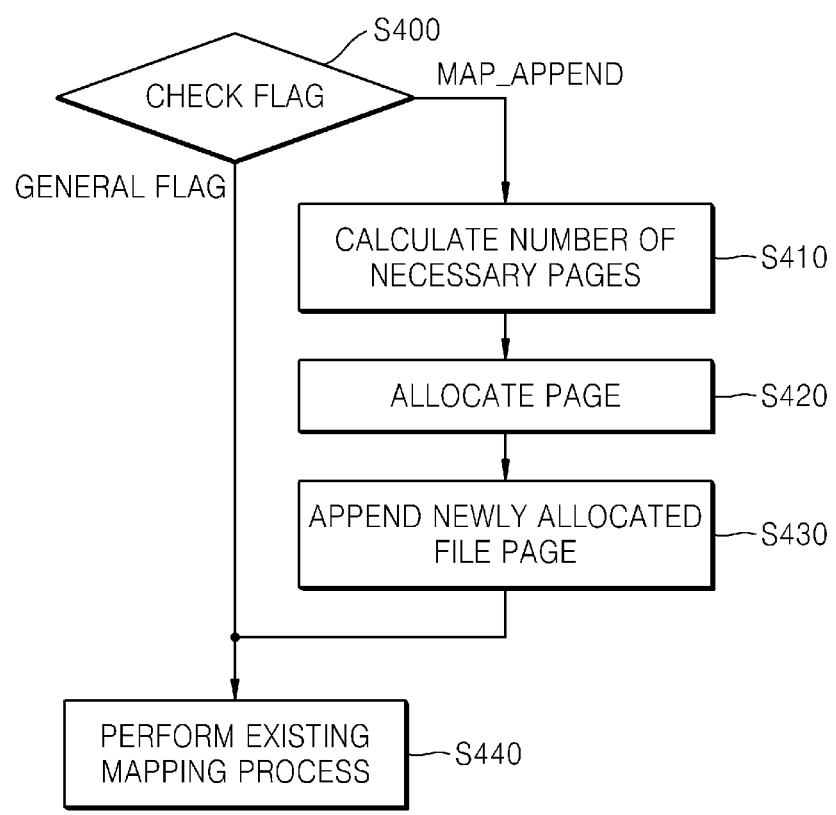
FIG. 14 is a flowchart illustrating a method of appending a file, according to an embodiment of the inventive concept.
Figure 15:
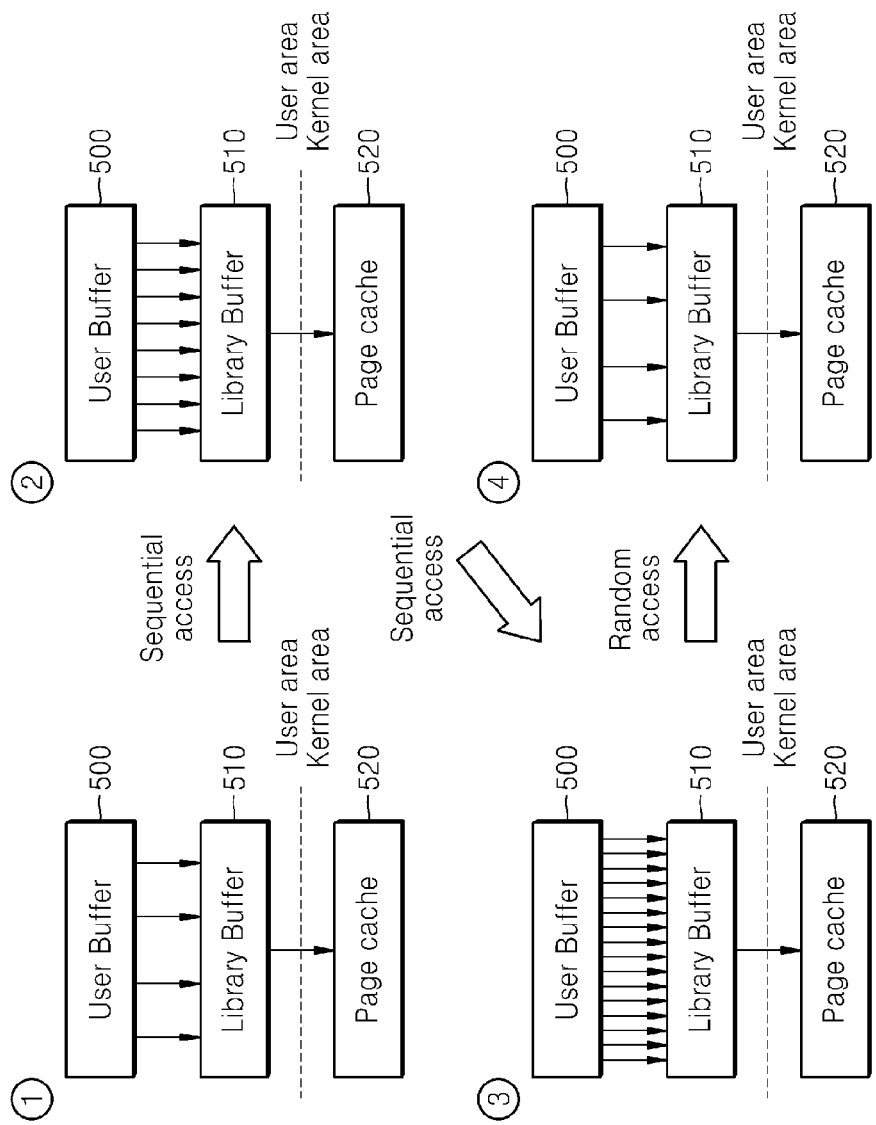
FIG. 15 is a diagram illustrating a mapping method of increasing a mapping size of a file page, according to an embodiment of the inventive concept.

For example, the mapping control unit 240 may control by transmitting a mapping command signal to the nonvolatile memory controller 100 to implement a method of mapping a file page loaded in the kernel area of the nonvolatile main memory 300 of FIG. 7 to the user area of the main memory, a mapping method of re-using a virtual area for mapping of FIG. 13, a mapping method of appending a file page of FIG. 14, and a mapping method of doubling a size of a file page to be mapped according to a sequential access signal and initializing the size according to an arbitrary access signal of FIG. 15.

Accordingly, a faster system speed may be obtained by using a mapping method optimized for the memory system 11 including the nonvolatile main memory 300.

Figure 4:
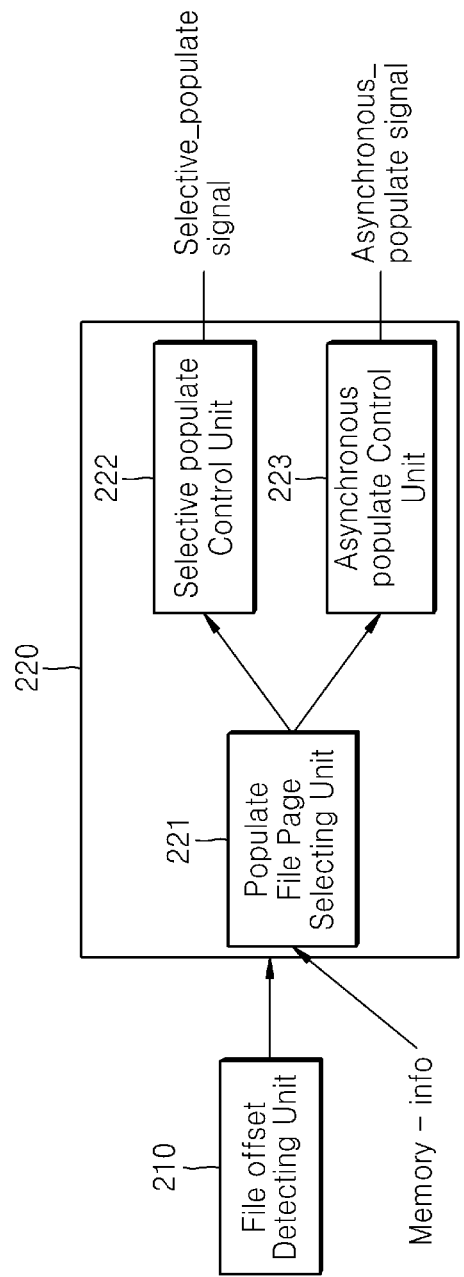
FIG. 4 is a block diagram illustrating a population control unit of FIG. 2, according to an embodiment of the inventive concept.

FIG. 4 is a block diagram illustrating the population control unit 200 of FIG. 2, according to an embodiment of the inventive concept.

Referring to FIG. 4, the population control unit 220 may further include a population target selection unit 221, a selective population control unit 222, and an asynchronous population control unit 223. Accordingly, the file offset detection unit 210 of the processor 200 may detect a file offset of a file which the processor 200 desires to access, and may transmit file offset information to the population target selection unit 221.

However, the file offset detection unit 210 is not limited to existing outside the population control unit 220, and may be included in the population control unit 220. The different units described herein may be implemented, for example, using various software, hardware, and/or firmware elements configured to perform the tasks performed by those units. While certain of these units, also described as circuits, may be shown as separate devices, they may be implemented by a single hardware element and/or software element (e.g., a processor and/or an executable programming code segment).

The population target selection unit 221 may receive file offset detection information. The population target selection unit 221 may determine a file page that is to be first executed in a program based on the file offset detection information. The file page that is to be first executed in the program may be determined, for example, according to an ascending order or descending order of a file offset.

Furthermore, a file page that should be populated with a next priority (e.g., and may be required as such) may be determined based on a file offset in a similar manner to that in the above. As a result, a file page that is to be populated into a space of the kernel area of the nonvolatile main memory 300 with a first priority or a next priority may be selected.

Accordingly, the selective population control unit 222 may receive an information signal of the file page that is to be populated with the first priority, and may transmit a selective population signal for populating the selected file page to the secondary storage apparatus 400 based on the information signal.

Also, the asynchronous population control unit 223 may receive an information signal of the file page that is to be populated with the next priority, and may transmit an asynchronous population signal for populating the file page that is to be populated with the next priority to the secondary storage apparatus 400 based on the information signal. In this case, the asynchronous population signal is transmitted in asynchronization with the selective population signal. The asynchronous population signal may be transmitted separately from the selective population signal. For example, the asynchronous population signal and the selective population signal may be transmitted in a non-simultaneous manner, such that start times and/or end times of their transmission are different. Since a file page for later processing (and that may be required) may be populated in advance, a response time of the computing system may be further increased.

However, the present embodiment is not limited thereto, and the asynchronous population signal may be transmitted in synchronization with the selective population signal.

Also, although the selective population control unit 222 and the asynchronous population control unit 223 are separated as two units, the selective population control unit 222 and the asynchronous population control unit 223 having software characteristics controlled by the OS may be realized as one block.

Figure 5:
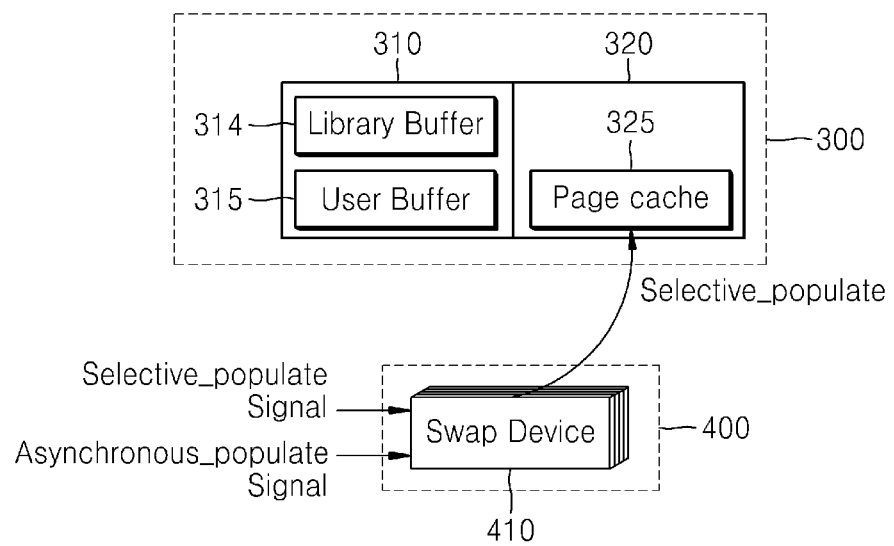
FIG. 5 is a detailed block diagram illustrating a nonvolatile main memory and a secondary storage apparatus of FIG. 1, according to an embodiment of the inventive concept.

FIG. 5 is a detailed block diagram illustrating the nonvolatile main memory 300 and the secondary storage apparatus 400 of FIG. 1, according to an embodiment of the inventive concept.

As shown in FIG. 5, the nonvolatile main memory 300 may include at least one nonvolatile memory. For example, the at least one nonvolatile memory may be implemented on a nonvolatile memory device, such as a memory chip or portion thereof, a stack of memory chips or portion thereof, or a memory module or portion thereof. In one embodiment, each nonvolatile memory may be divided into a user area 310 and a kernel area 320.

The user area 310 and the kernel area 320 have different access allowances. For example, the user area 310 may be accessed by a user without limitation, and the kernel area 320 may be accessed only when the OS of the processor 200 performs a system call.

The user area 310 that is a space of a memory that may be accessed by the user without limitation by using an application may further include a user buffer 315 and a library buffer 314.

The kernel area 320 that is a space of the memory may further include a page cache 325.

Also, the secondary storage apparatus 400 of FIG. 5 that is an apparatus for swapping a file that is not currently used to secure a space of the main memory may further include at least one swap device 410.

The swap device 410 of the secondary storage apparatus 400 performs swapping based on the page cache 325 corresponding one of a plurality of spaces of the kernel area of the main memory, but the present embodiment is not limited to the page cache 325.

The population control unit 220 may select a file page that is to be loaded with a first priority from among file pages that are not loaded in the page cache 325, and then may transmit a selective population signal to the swap device 410. The swap device 410 receiving the selective population signal may enable the selected file page to be selectively populated into the page cache 325.

Furthermore, the population control unit 220 may determine a file page that is to be loaded with a next priority, and may transmit an asynchronous population signal to the swap device 410. The swap device 410 receiving the asynchronous population signal may enable the file page that is to be loaded with the next priority to be populated in asynchronization with the selective population. However, the present embodiment is not limited thereto, and the swap device 410 may enable the file page that is to be loaded with the next priority to be populated in synchronization with the selective population.

Figure 6:
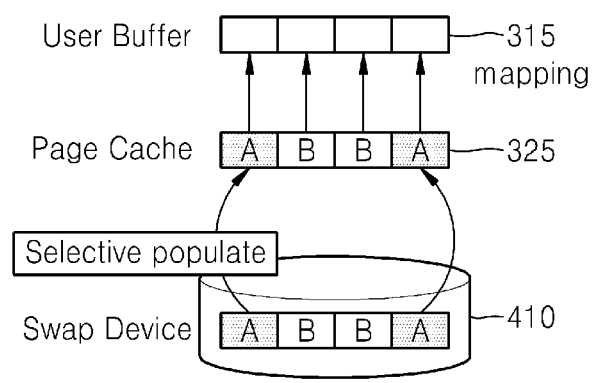
FIG. 6 is a detailed view illustrating a population process and a mapping process, according to an embodiment of the inventive concept.

FIG. 6 is a detailed diagram for explaining a population process and a mapping process, according to an embodiment of the inventive concept.

Population may involve loading a file page to be mapped in the nonvolatile main memory 300, and updating a mapping table with virtual address entry information that is newly mapped to a physical address of the file page or updating a mapping table with virtual address entry information that is newly mapped to a physical address of a file page that is already loaded in the nonvolatile main memory 300.

The swap device 410 may receive a signal for populating a file page A that is selected by the population control unit 220 into the page cache 325 that is one of various spaces of the kernel area of the nonvolatile main memory 300, and thus the selected file page A that is loaded in the swap device 410 may be populated into the page cache 325. Also, as shown in FIG. 6, although a file page B that is already loaded in the page cache 325 is not loaded from the swap device 410 to the page cache 325, since a virtual address that is mapped to a physical address of a file page is changed due to a mapping command of the processor 200, the file page that is already loaded in the page cache 325 is populated by updating the mapping table.

The present embodiment is not limited to the page cache 325, and may be applied to another space of the kernel area.

Accordingly, the processor 200 may more quickly access a file page.

FIG. 7 is a block diagram for explaining asynchronous population according to an embodiment of the inventive concept.

Referring to FIG. 7, the swap device 410 asynchronously populates a file page into the page cache 325 that is one of the spaces of the kernel area of the nonvolatile main memory 300.

As described above, the population target selection unit 221 of the population control unit 220 may select a file page C that is to be populated with a next priority into the nonvolatile main memory 300 based on a file offset. The file page C that uses the next priority may correspond to a file page that needs to be accessed in order to execute a program next to the file page A that is to be populated with the first priority of FIG. 5. Accordingly, the population control unit 220 may transmit a population signal for selecting and populating the file page C with the next priority to the swap device 410. The swap device 410 receiving the population signal may populate the file page C with the next priority into the page cache 325 that is one of various spaces of the kernel area of the main memory.

The population may be performed in asynchronization with selective population. Accordingly, selective population having a first priority may be first performed, and then asynchronous population may be performed later to populate a necessary file page into the page cache 325 in advance. Alternatively, the second population may be performed in synchronization with the selective population.

As a result, a speed at which access to a file page that is used to execute a program (and may be necessary for execution) occurs may be increased.

However, a space of the kernel area of the main memory is not limited to the page cache 325, and a file page may be populated into another space of the kernel area.

Figure 8:
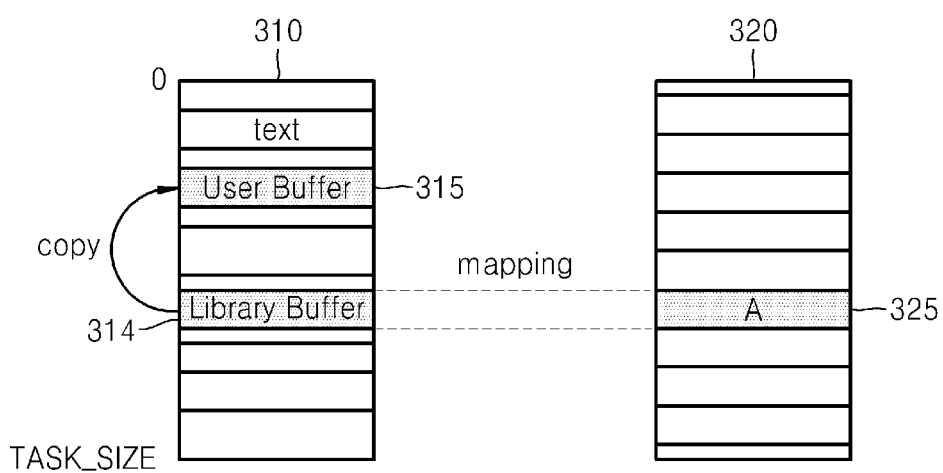
FIG. 8 is a detailed diagram for explaining a mapping method in a main memory, according to an embodiment of the inventive concept.

FIG. 8 is a detailed diagram for explaining a mapping method in the nonvolatile main memory 300, according to an embodiment of the inventive concept.

The mapping method of FIG. 8 is a mapping method when the nonvolatile main memory 300 is provided, and a read/write system call is not directly used and a standard input/output library is used. The left picture corresponds to the user area 310 of the nonvolatile main memory 300 and the right picture corresponds to the kernel area 320 of the nonvolatile main memory 300.

Various spaces may exist in the user area 310, and the library buffer 314 and the user buffer 315 may be included in the various spaces.

Various spaces may exist in the kernel area 320, and the page cache 325 may be included in the various spaces.

When the standard input/output library is used, the library buffer 314 may be used. In a general volatile main memory, in order for the processor 200 to operate a program, a file page that is stored in the secondary storage apparatus 400 is copied to a library buffer and the copied file page is re-copied to a user buffer which the user may access without limitation by using an application.

Unlike in the general volatile main memory, since a file page may be stored in the kernel area of the nonvolatile main memory 300 of FIG. 8, the file page A that is desired to be accessed in the page cache 325 existing in the kernel area of the nonvolatile main memory 300 may be mapped to the library buffer 314 of a virtual user area.

Accordingly, a file page that is stored in the page cache 325 may be accessed through such mapping, and the file page may be copied to the user buffer 315 where the user may freely write and read the file page.

Accordingly, since it is not necessary to copy a file page that is stored in the secondary storage apparatus 400 to the page cache 314 that is one of spaces of the kernel area of the main memory and then to copy again the file page to the user buffer 315, efficiency of memory management may be improved.

The library buffer 314 and the user buffer 315 that are spaces of the user area of the nonvolatile main memory 300 and the page cache 325 that is a space of the kernel area of the nonvolatile main memory 300 are exemplary, and the present embodiment is not limited thereto. For example, the spaces are shown as contiguous regions, but in some embodiments, non-contiguous regions may be used as the library buffer 314, user buffer 315, and/or page cache 325.

Figure 9:
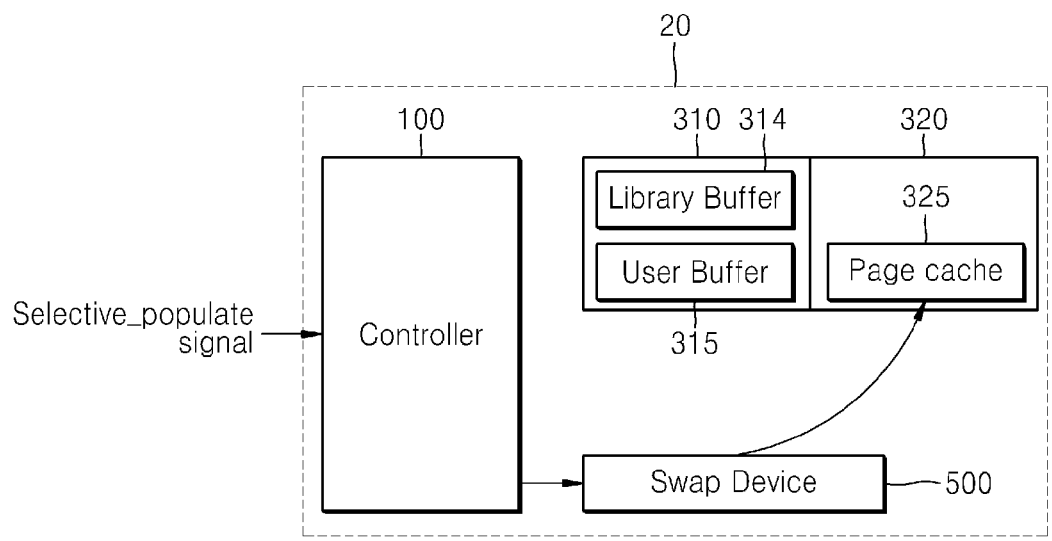
FIG. 9 is a block diagram illustrating a swap device of FIG. 5 that is realized as a nonvolatile memory, according to another embodiment of the inventive concept.

FIG. 9 is a block diagram illustrating a swap device 500 that is realized as a nonvolatile memory, according to another embodiment of the inventive concept.

As shown in FIG. 9, the swap device 500 may be included as a nonvolatile memory in the memory system 11, instead of the secondary storage apparatus 400. Accordingly, the swap device 500 that is a nonvolatile memory may include a MRAM, a RRAM, a FRAM, a PCM, or a STT-MRAM.

Since an access speed of the nonvolatile memory is higher than an access speed of the secondary storage apparatus 400, a time taken to populate a file page and a response time of the main memory may be reduced.

Also, since the main memory has a greater memory capacity, a response speed of the main memory may be increased by directly loading a file page and omitting population.

Figure 10:
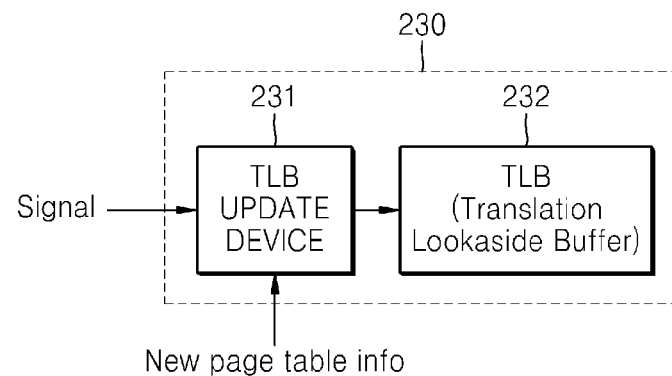
FIG. 10 is a detailed block diagram illustrating a translation lookaside buffer (TLB) management unit according to an embodiment of the inventive concept.

FIG. 10 is a detailed block diagram illustrating the TLB management unit 230 according to an embodiment of the inventive concept.

Referring to FIG. 10, the TLB management unit 230 may further include a TLB update device 231 and a TLB 232.

When the processor 200 applies a mapping command and a physical address corresponding to a virtual address of a file is changed, the TLB management unit 230 may receive updated mapping information from the mapping table in the nonvolatile main memory 300, may update a virtual address of a file page that is often used and an entry of a physical address that is mapped to the virtual address based on the updated mapping information, and may store the virtual address and the entry in the TLB 232.

In this case, the TLB update device 231 receives a signal indicating that the processor 200 applies a mapping-related command. Next, the TLB update device 231 receives from the nonvolatile main memory 300 information of a page table that is updated by being newly mapped. The mapping table is stored in the nonvolatile main memory 300. When the TLB management unit 230 of the processor 200 transmits a mapping table information request command to the nonvolatile main memory 300, the nonvolatile main memory 300 reads the mapping table that is stored in the nonvolatile main memory 300 and transmits the mapping table to the TLB update device 231.

The TLB 232 updates and re-stores the virtual address and the entry of the physical address based on updated mapping table information.

Figure 11:
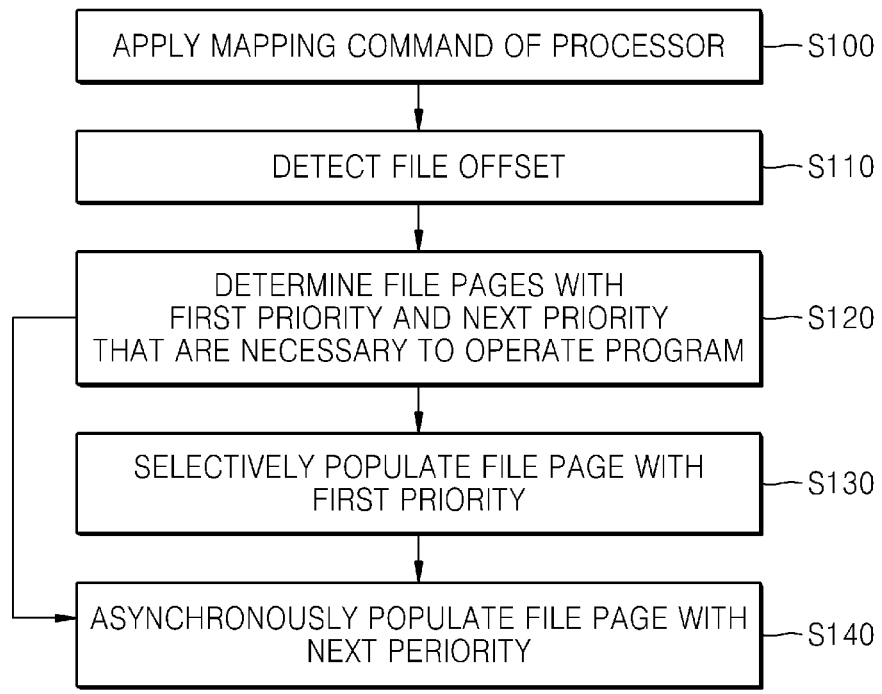
FIG. 11 is a flowchart illustrating a mapping and population method according to an embodiment of the inventive concept.

FIG. 11 is a flowchart illustrating a mapping and population method according to an embodiment of the inventive concept.

Referring to FIG. 11, in operation S100, a virtual area of a process is allocated due to a command or a system call of a processor, and the processor applies a mapping command for mapping a virtual address of the virtual area to a physical address of a file page. Next, in operation S110, a file offset that is used to execute a program (and may be necessary for execution) is detected. A file offset detection unit that detects the file offset may be included, for example, in the processor or a population control unit. In operation S120, an order of files that are used to operate the process (and may be necessary to operate the process) is determined based on the detected file offset, and a file page that is used with a first priority or a next priority is selected. The order of the files is a descending order or an ascending order of the file offset.

The order of the files may be determined, for example, by a population target selection unit, and the population target selection unit may be included in the processor or the population control unit.

Next, in operation S130, a file page to be populated with a first priority is populated. In this case, when the file page that has (e.g., needs) the first priority already exists in a page cache that is a space of a kernel area of a nonvolatile main memory, only a mapping table of a physical address of a file page and a virtual address of the process may be updated.

In contrast, when the file page that has (e.g., needs) the first priority does not exist in the page cache, a swap device of a secondary storage apparatus my load the file page in the page cache, and then a mapping table of a physical address of the loaded file page and a virtual address of the process may be updated.

Next, in operation S140, asynchronous population for accessing a file page with a next priority is performed. When the file page that has (e.g., requires) the next priority is loaded in the page cache, the file page that has (e.g., requires) the next priority does not need to be fetched from the swap device. Accordingly, population may be performed by updating a mapping table of a physical address of the file page that has the next priority and a virtual address of the process.

However, when the file page that has the next priority is not loaded in the page cache, the swap device may load the file page with the next priority in the page cache in asynchronization with the selective population, and may update a mapping table of a physical address of the loaded page cache and a virtual address of the process.

Figure 12:
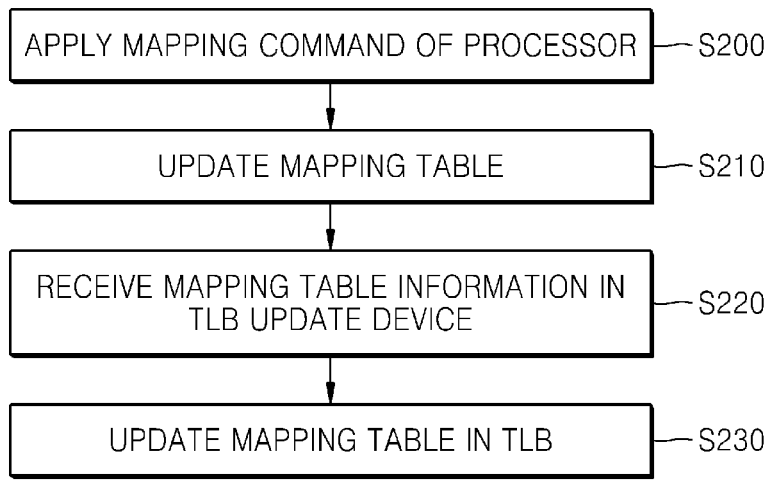
FIG. 12 is a flowchart illustrating an updating method of a TLB, according to an embodiment of the inventive concept.

FIG. 12 is a flowchart illustrating an updating method of a TLB, according to an embodiment of the inventive concept.

Referring to FIG. 12, in operation S200, a virtual area of a nonvolatile main memory is allocated due to a system call or a command of a processor, and the processor applies a mapping command for mapping a virtual address of the virtual area to a physical address of a file page.

Next, in operation S210, the file page is loaded in a page cache that is a space of a kernel area of the nonvolatile main memory, and a mapping table between the page cache and the physical address is updated.

In this case, in operation S220, a TLB update device may receive through a nonvolatile memory controller information of the mapping table that exists in the nonvolatile main memory.

In operation S230, mapping information that is stored in the TLB, that is, a mapped entry of a physical address and a virtual address, is updated based on the received information of the mapping table.

Accordingly, the number of TLB misses may be reduced compared to a conventional method, and thus a faster system operation may be ensured.

FIG. 13 is a flowchart illustrating a method of re-using a virtual area, according to an embodiment of the inventive concept.

Referring to FIG. 13, a method of re-using a virtual area when the virtual area is allocated in a mapping step is performed.

First, once mapping starts, a virtual area is allocated. A virtual address, accessibility, and a size of the virtual area may be defined as a structure such as vm_area_struct.

In detail, in operation S300, a flag of a file is checked. When a general flag is detected, the method proceeds to operation S310. A virtual area corresponding to an allocated virtual address of a process may be searched, for example, by using a binary data structure such as a red-black tree. In operation S320, it is determined whether the virtual area of the virtual address is an area that is mapped to a physical address of an actual memory and is being used. When it is determined in operation S320 that the virtual area is being used, the method proceeds to operation S330. In operation S330, the virtual area that is being used may be deleted in the red-black tree. Next, in operation S340, a virtual area is re-allocated. In operation S350, the virtual area may be re-inserted into the red-black tree to be managed. In operation S360, a virtual address of the virtual area may be mapped to a physical address of a file page which the process desires to access.

When a special flag such as MAP_REPLACE which a user may set is detected during the checking of the flag, the method proceeds to operation S370. In operation S370, a virtual area corresponding to the allocated virtual address of the process may be searched in the red-black tree. In operation S380, characteristics of the searched virtual area, for example, 1) a location, 2) accessibility, and 3) a size of the virtual address, may be detected. Next, in operation S390, it is determined whether the virtual area may be re-used. When the characteristics are identical, it may be determined in operation S390 that the virtual area may be re-used. However, when the characteristics are not identical, the method returns to operation S330 in which the virtual area is deleted.

Accordingly, since an overhead of deleting, allocating, and re-arranging a virtual area is reduced, a response speed of a memory system is increased.

The present embodiment is not limited thereto, and characteristics of a virtual area, a flag of a file, and a virtual address may be managed by using any of various other methods.

FIG. 14 is a flowchart illustrating a method of appending a file, according to an embodiment of the inventive concept.

In detail, in operation S400, a processor may check a flag of a file, and may select an existing mapping process or a file appending process of an embodiment of the inventive concept. When a general flag is detected, the method proceeds to operation S440. In operation S440, the existing mapping process may be directly performed.

For example, when a special flag such as MAP_APPEND which a user may set is detected, the method proceeds to operation S410. In operation S410, when an area to be mapped to operate a process exceeds an overall file offset, the number of file pages that are to be first allocated is calculated. In operation S420, the file pages are allocated. Next, in operation S430, newly allocated file pages are newly appended to a file by being connected through a data structure of a file system. Next, in operation S440, the newly allocated file pages are recognized as the file, and the existing mapping process of mapping a physical address and a virtual address of each allocated file page is performed.

Accordingly, in FIG. 14, since a file may be appended in a mapping step, a time taken to append a file and perform re-mapping is reduced, thereby increasing a response speed of a memory system.

FIG. 15 is a diagram for explaining a mapping method of increasing a mapping size of a file page, according to an embodiment of the inventive concept.

A user buffer 500 that is a space of a user area of a nonvolatile main memory may transmit a file page request command to a library buffer in order to operate a process. In this case, in FIG. 15, referring to the first picture, a file page request command may be transmitted four times in total to the library buffer 510 when a size of a file page (e.g., which may be a required file page) is 1 KB. In this case, the library buffer 510 does not access a kernel area of the nonvolatile main memory during a system call whenever the file page request command is received, but may perform only one system call for the file page request command four times, for example, a 4 KB-file page. Accordingly, during the system call, the 4 KB-file page in a page cache 520 corresponding to a space of the kernel area may be mapped to a virtual area of the library buffer 510.

Next, when a command transmitted to the library buffer 510 is a sequential access command, for example, the file page request command for read is continued, referring to the second picture, the user buffer 500 may transmit the 1 KB-file page request command to the library buffer 510 eight times in total. In this case, a size of a mapped file page of the library buffer 510 may be doubled, and during a system call, a 8 KB-file page in the page cache 52 corresponding to a space of the kernel area of the nonvolatile main memory may be mapped.

Next, when sequential access is continued, referring to the third picture, a 16 KB-file page that is two times greater than the mapped file page of the second picture may be mapped.

However, when random-access occurs to change from the third picture to the fourth picture, for example, when an iseek command is generated in a command of the user buffer 500, it may be determined that the random-access occurs. In this case, referring to the fourth picture, a file page request command of the user buffer 500 is transmitted four times as in the first picture. For example, the library buffer 510 may map a 4 KB-file page during one system call. As a result, when random-access occurs, a mapped file page may be initialized to a basic value.

A basic value of a mapping size of a file page may be exemplarily 4 KB, but the present embodiment is not limited thereto. Also, a maximum value of a mapping size may vary according to each memory system, but may preferably range from about 32 KB to about 64 KB. However, the present embodiment is not limited thereto, a maximum value of a mapping size may be set to be less than 32 KB or greater than 64 KB. Also, a multiple of a mapping size of a file page may be any of various values, for example, 2 or 3.

In FIG. 15, the number of system calls is reduced and an overload applied to a library is reduced, thereby improving the performance of a memory system.

Figure 16:
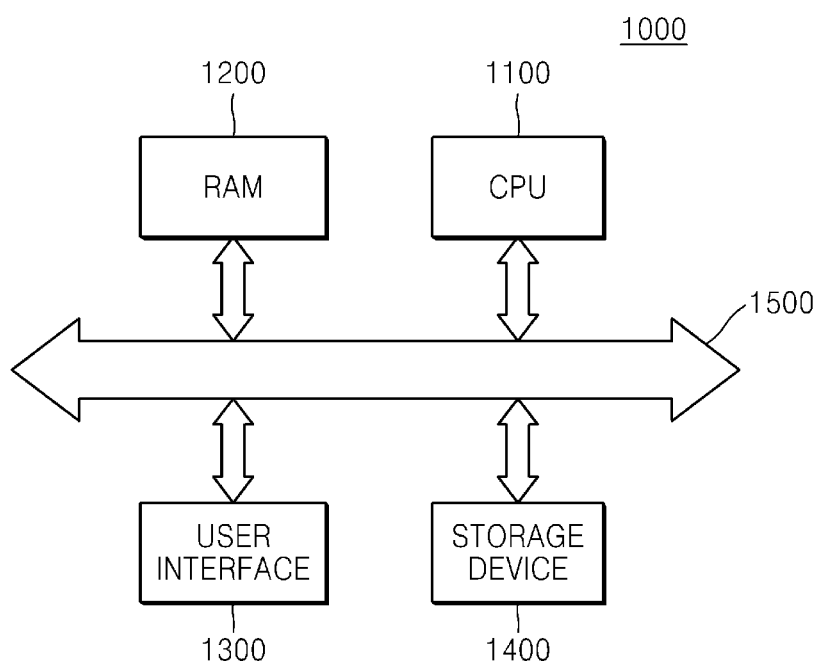
FIG. 16 is a block diagram illustrating a computing system including a nonvolatile memory system, according to an embodiment of the inventive concept.

FIG. 16 is a block diagram illustrating a computing system 1000 including a nonvolatile memory system, according to an embodiment of the inventive concept.

The nonvolatile memory system may be mounted as a RAM 1200 on the computing system 1000 such as a mobile device or a desktop computer. The nonvolatile memory system that is mounted as the RAM 1200 may be any of the nonvolatile memory systems of the above embodiments.

The computing system 1000 includes a central processing unit (CPU) 1100, the RAM 1200, a user interface 1300, and a storage device 1400. The CPU 1100, the RAM 1200, the user interface 1300, and the storage device 1400 are electrically connected to a bus 1500. In the computing system 1000, the RAM 1200 that is a nonvolatile memory for storing data may be a MRAM based on magnetoresistance from among nonvolatile memories. The MRAM is different from a volatile RAM in many aspects. Since the MRAM is nonvolatile, the MRAM may retain memory contents even when a memory device is not powered.

Also, the RAM 1200 may be realized by using a STT-MRAM. In some embodiments, the RAM 1200 may be realized as a ReRAM, a MRAM, a FeRAM, or the like.

The storage device 1400 may be, for example, an HDD or a solid state drive (SDD), and may be realized as a nonvolatile memory such as a MRAM, a STT-MRAM, a ReRAM, or a FeRAM, like the RAM 1200.

Figure 17:
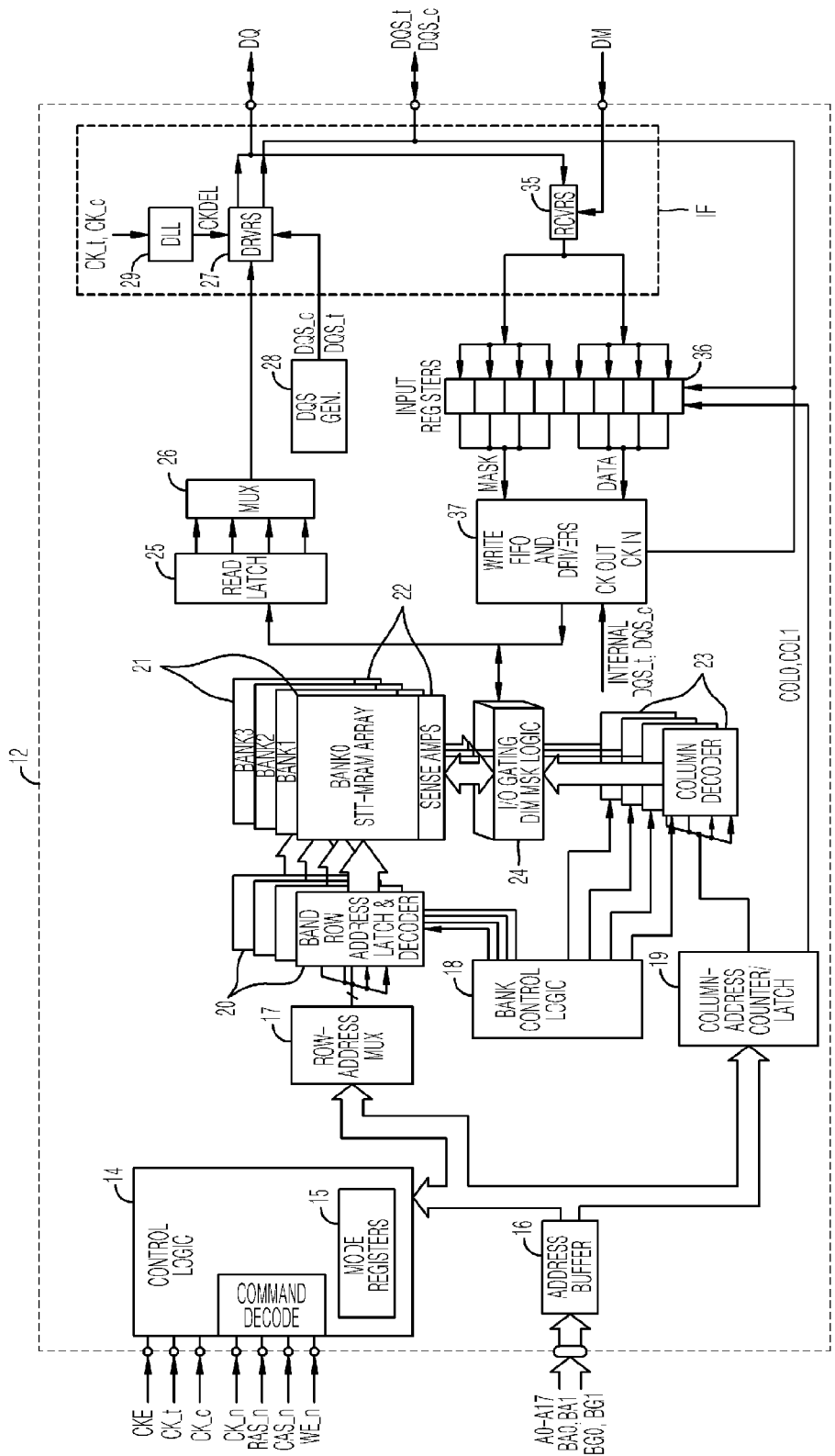
FIG. 17 is a diagram for explaining a magnetoresistive random-access memory (MRAM), according to an embodiment of the inventive concept.

FIG. 17 is a diagram for explaining a MRAM 12 according to an embodiment of the inventive concept.

Referring to FIG. 17, the MRAM 12 is a double data rate device that operates in synchronization with a rising edge/falling edge of a clock signal CK. The MRAM 12 supports various data rates according to an operating frequency of the clock signal CK. For example, when an operating frequency of the clock signal CK is 800 MHz, the MRAM 12 supports a data rate of 1600 MT/s. The MRAM 12 may support data rates of 1600, 1867, 2133, and 2400 MT/s.

The MRAM 12 includes a control logic and command decoder 14 that receives a plurality of commands and clocking signals via a control bus from an external device such as a memory controller. The command signals include a chip selection signal CK_n, a write enable signal WE_n, a column address strobe signal CAS_n, and a row address strobe signal RAS_n. The clocking signals include a clock enable signal CKE, and complementary clock signals CK_t and CK_c. Here, _n indicates an active row signal. _t and _c indicate a signal pair. The chip selection signal CK_n, the write enable signal WE_n, the column address strobe signal CAS_n, and the row address strobe signal RAS_n that are the command signals may be driven with a logic value corresponding to a specific command such as a read command or a write command.

The control logic 14 includes a mode register 15 that provides a plurality of operation options of the MRAM 12. The mode register 15 may program various functions, characteristics, and modes of the MRAM 12. The mode register 15 may control a burst length, a read burst type, a CAS latency, a test mode, a DLL reset, write recovery and read command-to-precharge command characteristics, and use of a DLL during precharge power down. The mode register 15 may store data for controlling a DLL enable/disable, n output drive intensity, an additive latency, a write leveling enable/disable, a TDQS enable/disable, and an output buffer enable/disable. The mode register 15 may store data for controlling a CAS write latency, dynamic termination and write CRC.

The mode register 15 may store data for controlling a MPR location function, a MPR operation function, a gear down mode, a per MRAM addressing mode, and a MPR read format. The mode register 15 may store data for controlling a power-down mode, a Vref monitoring CS-to-command/address latency mode, a read preamble training mode, a read preamble function, and a write preamble function. The mode register 15 may store data for controlling a C/A parity function, a CRC error state, a C/A parity error state, an ODT input buffer power down function, a data mask function, a write DBI function, and a read DBI function. The mode register 15 stores data for controlling a VrefDQ training value, a VrefDQ training range, a VrefDQ training enable, and a tCCD timing.

The command decoder 14 latches and decodes a command that is applied in response to the complementary clock signals CK_t and CK_c. The command decoder 14 generates a sequence of clocking and control signals by using internal blocks for performing a function of the applied command.

The MRAM 12 further includes an address buffer 16 that receives a row, a column, bank addresses A0-A17, BA0, and BA1, and bank group addresses BG0 and BG1 from a memory controller via an address bus. The address buffer 16 receives a row address, a bank address, and a bank group address applied to a row address multiplexer 17 and a bank control logic unit 18.

The row address multiplexer 17 applies the row address received from the address buffer 16 to a plurality of address latch and decoders 20. The bank control logic unit 18 activates the address latch and decoders 20 corresponding to the bank addresses BA1 and BA0 and the bank group signals BG1 and BG0 received from the address buffer 16.

The activated address latch and decoders 20 apply various signals to memory banks 21 in order to activate a row of a memory cell corresponding to the decoded row address. Each of the memory banks 21 includes a memory cell array including a plurality of memory cells. Data stored in memory cells of the activated row is detected and amplified by sense amplifiers 22.

After the row and bank addresses are applied, a column address is applied via the address bus. The address buffer 16 applies the column address to a column address counter and latch 19. The column address counter and latch 19 latches the column address, and applies the latched column address to a plurality of column decoders 23. The bank control logic unit 18 activates the column decoders 23 corresponding to the received bank address and the received bank group address, and the activated column decoders 23 decode the column address.

According to an operation mode of the MRAM 12, the column address counter and latch 19 may directly apply the latched column address to the column decoders 23 or may apply a column address sequence starting from the column address provided by the address buffer 16 to the column decoders 23. The column decoders 23 that are activated in response to the column address applied from the column address counter and latch 19 apply decode and control signals to a I/O gating and DM mask logic unit 24. The I/O gating and DM mask logic unit 24 accesses memory cells corresponding to the decoded column address from among memory cells of the row that is activated in the accessed memory banks 21.

According to a read command of the MRAM 12, data is read from addressed memory cells, and is connected to a read latch 25 by the I/O gating and DM mask logic unit 24. The I/O gating and DM mask logic unit 24 provides N-bit data to the read latch 25, and the read latch 25 applies, for example, 4 N/4 bits, to a multiplexer 26.

The MRAM 12 may have N prefetch architectures corresponding to a burst length N in each memory access. For example, the MRAM 12 may have a 4n-prefetch architecture that retrieves 4 pieces of n-bit data. The MRAM 12 may be a x4 memory device that provides and receives 4-bit data at every edges of the complementary clock signals CK_t and CK_c. Also, the MRAM 12 may have an 8n prefetch architecture. When the MRAM 12 has a 4n prefetch architecture and a x4 data width, the I/O gating and DM mask logic unit 24 provides 16 bits to the read latch 25 and provides 4 pieces of 4-bit data to the multiplexer 26.

A data driver 27 sequentially receives N/4 bit data from the multiplexer 26. Also, the data driver 27 receives data strobe signals DQS_t and DQS_c from a strobe signal generating unit 28, and receives a delayed clock signal CKDEL from a DLL 29. A DQS signal is used by an external device such as a memory controller to synchronously receive read data during a read operation.

In response to the delayed clock signal CKDEL, the data driver 27 sequentially outputs received data to a data terminal DQ according to a corresponding data word. Each data word is output to one data bus in synchronization with rising and falling edges of the complementary clock signals CK_t and CK_c applied to the MRAM 12 and is output to one data bus. A first data word is output in accordance with a time according to a programmed CAS latency after a read command. Also, the data driver 27 outputs the data strobe signals DQS_t and DQS_c having rising and falling edges synchronized with rising and falling edges of the complementary clock signals CK_t and CK_c.

In a write operation of the MRAM 12, the external device such as a memory controller applies, for example, N/4 bit data words to the data terminal DQ, and applies a DQS signal and a DM signal to the data bus. A data receiver 35 receives each data word and a DM signal related to each data word, and applies the data word and the DM signal to input registers 36 that are clocked to the DQS signal.

In response to a rising edge of the DQS signal, the input registers 36 latch a first N/4 bit data word and a DM signal related to the first N/4 bit data word, and in response to a falling edge of the DQS signal, latch a second N/4 bit data word and a DM signal related to the second N/4 bit data word. The input registers 36 provide, in response to the DQS signal, 4 latched N/4 bit data words and DM signals to a write FIFO and driver 37. The write FIFO and driver 37 receives a N-bit data word.

The data word is clocked out from the write FIFO and driver 37 and is applied to the I/O gating and DM mask logic unit 24. The I/O gating and DM mask logic unit 24 transmits the data word to addressed memory cells in the memory banks 21 that are accessed by using a DM signal. The DM signal selectively masks predetermined bits or a bit group from among data words to be written to the addressed memory cells.

Figure 18:
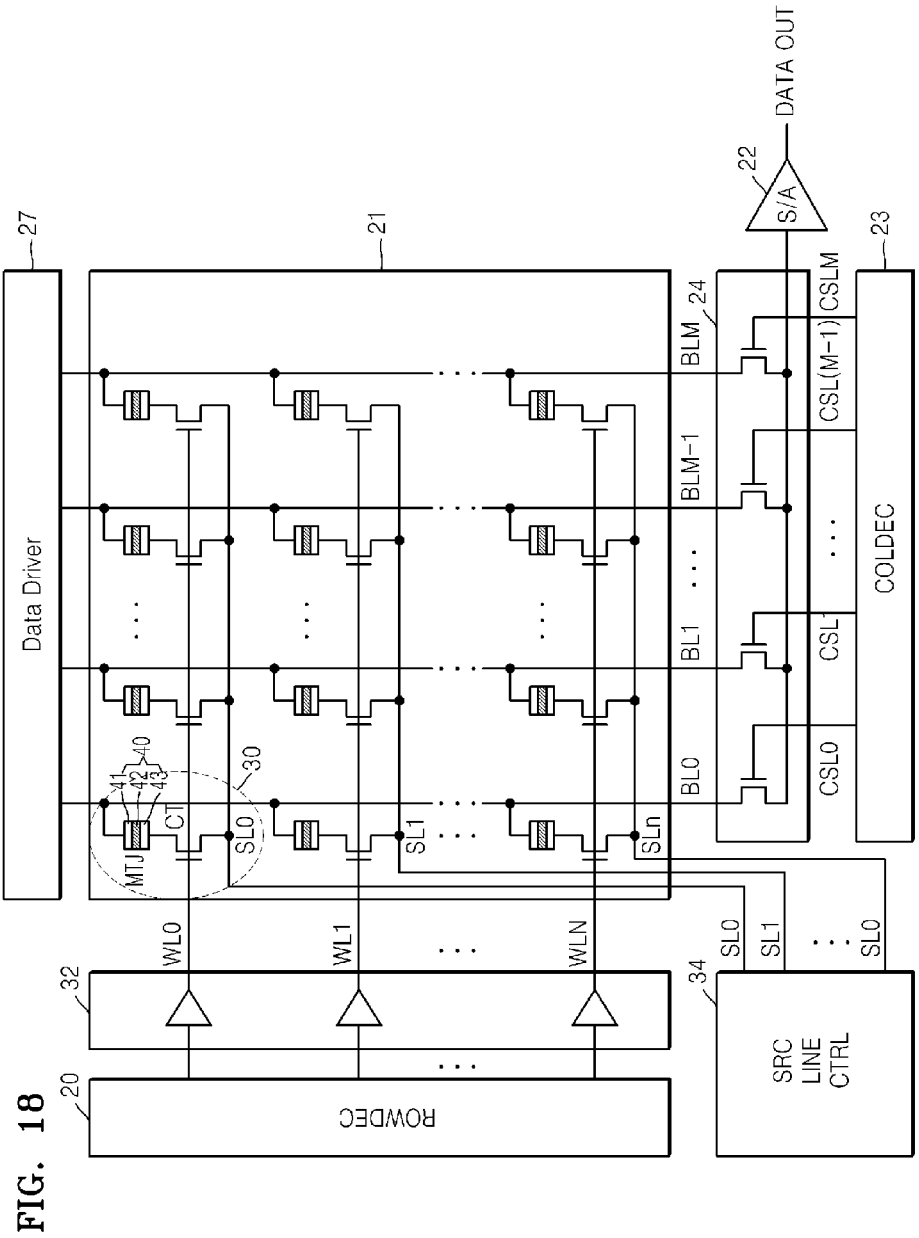
FIG. 18 is a diagram for explaining a memory cell array in a memory bank of FIG. 17, according to an embodiment of the inventive concept.

FIG. 18 is a diagram for explaining a memory cell array in each of the memory banks 21 of FIG. 17, according to an embodiment of the inventive concept.

Referring to FIG. 18, the memory cell array includes a plurality of word lines WL0 through WLN (where N is a natural number equal to or greater than 1), a plurality of bit lines BL0 through BLM (where M is a natural number equal to or greater than 1), a plurality of source lines SL0 through SLN (where N is a natural number equal to or greater than 1), and a plurality of memory cells 30 that are disposed at intersections between the word lines WL0 through WLN and the bit lines BL0 through BLM. Each of the memory cells 30 may be a STT-MRAM cell. The memory cell 30 may include an MTJ device 40 including a magnetic material.

Each of the plurality of memory cells 30 may include a cell transistor CT and the MTJ device 40. Upon examining one memory cell 30 from among the plurality of memory cells 30, a drain of the cell transistor CT is connected to a pinned layer 41 of the MTJ device 40. A free layer 43 of the MTJ device 40 is connected to the bit line BL0, and a source of the cell transistor CT is connected to the source line SL0. A gate of the cell transistor CT is connected to the word line WL0.

The MTJ device 40 may be replaced by a resistive device such as a PRAM using a phase change material, a RRAM using a variable resistive material such as complex metal oxide, or a MRAM using a ferromagnetic material. Materials of the resistive devices have resistance values that vary according to a size and/or a direction of a voltage or current, and have nonvolatile characteristics so that the resistance values are maintained even when the current or voltage is cut off.

The word line WL0 is enabled by the row decoder 20, and is connected to a word line driving unit 32 that drives a word line selection voltage. The word line selection voltage activates the word line WL0 in order to read or write a logic state of the MTJ device 40.

The source line SL0 is connected to a source line circuit 34. The source line circuit 34 receives an address signal and a read/write signal, decodes the address signal and the read/write signal, and generates a source line selection signal to the source line SL0 that is selected. A ground reference voltage is applied to the source lines SL1 through SLN that are not selected.

The bit line BL0 is connected to a column selection circuit 24 that is driven by column selection signals CSL0 through CSLM. Any of the column selection signals CSL0 through CSLM is selected by the column decoder 23. For example, the column selection signal CSL0 that is selected turns on a column selection transistor in the column selection circuit 24 and selects the bit line BL0. A logic state of the MTJ device 40 is read to the selected bit line BL0 through the sense amplifier 22. Alternatively, write current that is applied through the data driver 27 is transmitted to the selected bit line BL0 that is selected, and then is written to the MTJ device 40.

Figure 19:
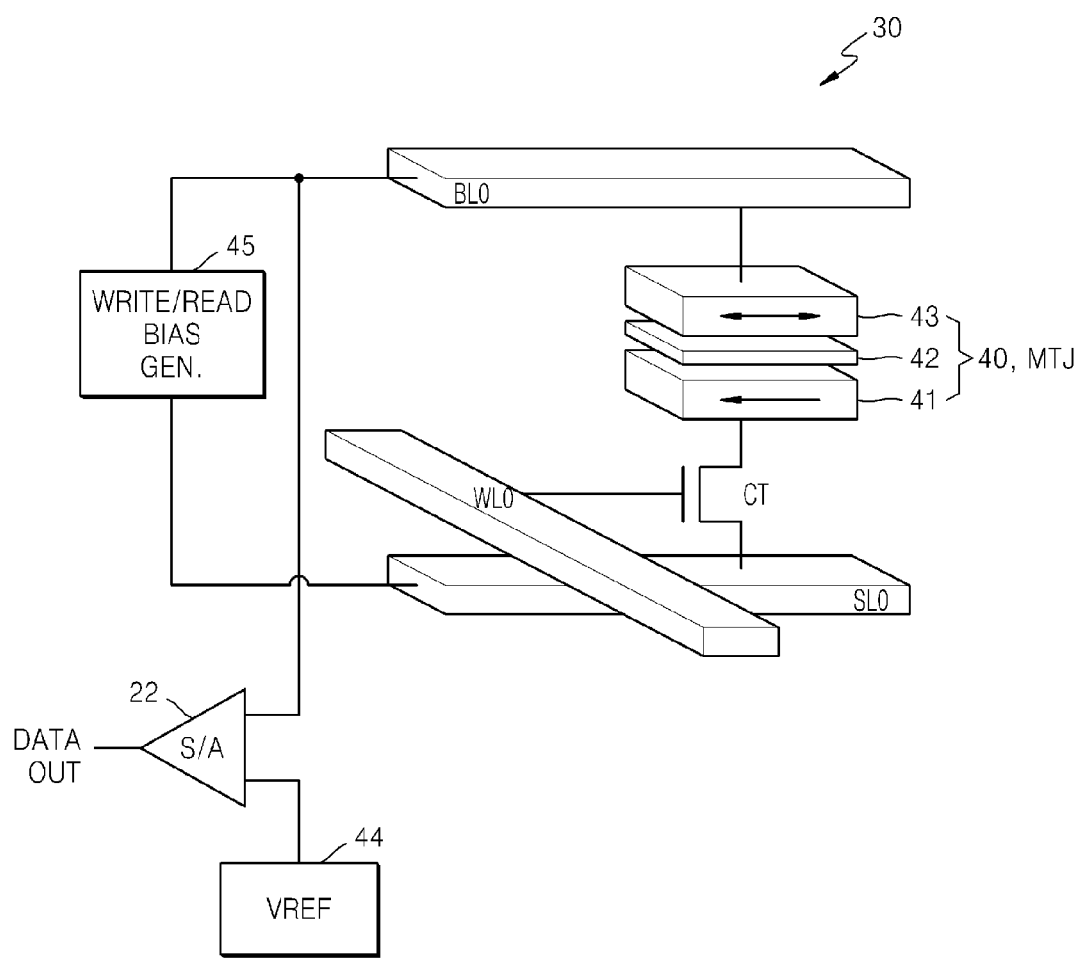
FIG. 19 is a three-dimensional (3D) view illustrating a STT-MRAM cell of FIG. 18, according to an embodiment of the inventive concept.

FIG. 19 is a three-dimensional (3D) view illustrating the memory cell 30 that is a STT-MRAM cell (hereinafter, referred to as a STT-MRAM cell 30) of FIG. 18, according to an embodiment of the inventive concept.

Referring to FIG. 19, the STT-MRAM cell 30 may include the MTJ device 40 and the cell transistor CT. A gate of the cell transistor CT is connected to a word line (for example, the word line WL0), and one electrode of the cell transistor CT is connected to a bit line (for example, the bit line BL0) through the MTJ device 40. Also, the other electrode of the cell transistor CT is connected to a source line (for example, the source line SL0).

The MTJ device 40 may include the free layer 41, the pinned layer 43, and a tunnel layer 42 that is disposed between the free layer 41 and the pinned layer 43. A magnetization direction of the pinned layer 43 may be fixed, and a magnetization direction of the free layer 41 may be parallel or anti-parallel to a magnetization direction of the pinned layer 43 according to written data. In order to fix a magnetization direction of the pinned layer 43, for example, an anti-ferromagnetic layer (not shown) may be further provided.

For a write operation of the STT-MRAM cell 30, the cell transistor CT is turned on by applying a voltage of a logic high to the word line WL0. Program current, that is, write current, that is provided from a write/read bias generating unit 45 is applied to the bit line BL0 and the source line SL0. A direction of the write current is determined by a logic state to be written to the MTJ device 40.

For a read operation of the STT-MRAM cell 30, the cell transistor CT is turned on by applying a voltage of a logic high to the word line WL0, and read current is applied to the bit line BL0 and the source line SL0. Accordingly, a voltage is developed at both ends of the MTJ device 40, is sensed by the sense amplifier 22, and is compared with that of a reference voltage generating unit 44 for determining a logic state written to the MTJ device 40. Accordingly, data that is stored in the MTJ device 40 may be identified.

Figure 20A:
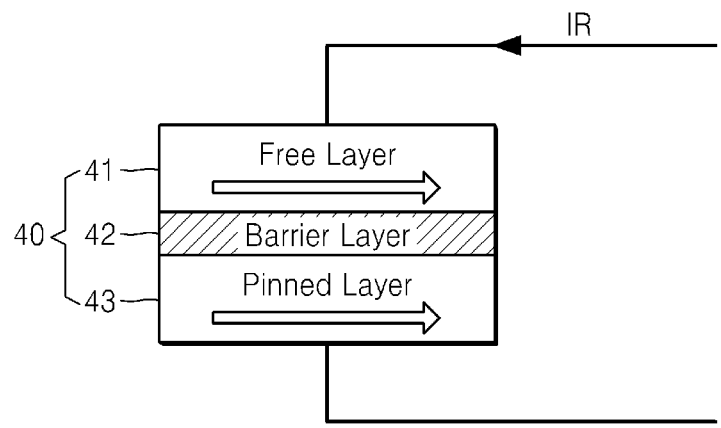
FIGS. 20A and 20B are block diagrams for explaining magnetization directions according to data written to an MTJ device of FIG. 19, according to embodiments of the inventive concept.
Figure 20B:
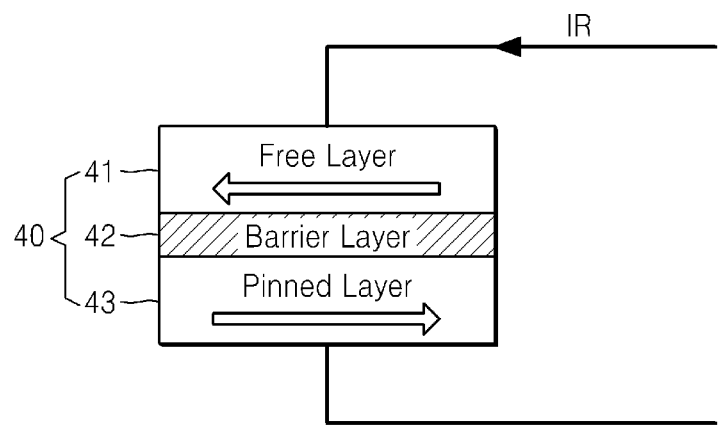

FIGS. 20A and 20B are block diagrams for explaining magnetization directions according to data written to the MTJ device 40 of FIG. 19, according to embodiments of the inventive concept. A resistance value of the MTJ device 40 varies according to a magnetization direction of the free layer 41. When read current IR flows to the MTJ device 40, a data voltage according to a resistance value of the MTJ device 40 is output. Since an intensity of the read current IR is much less than an intensity of write current, a magnetization direction of the free layer 41 is not changed by the read current IR.

Referring to FIG. 20A, a magnetization direction of the free layer 41 and a magnetization direction of the pinned layer 43 of the MTJ device 40 are parallel to each other. Accordingly, the MTJ device 40 has a low resistance value. In this case, data "0" may be read out.

Referring to FIG. 20B, a magnetization direction of the free layer 41 and a magnetization direction of the pinned layer 43 of the MTJ device 40 are anti-parallel to each other. In this case, the MTJ device 40 has a high resistance value. In this case, data "1" may be read out.

Although the MTJ device 40 includes the free layer 41 and the pinned layer 43 that are horizontal magnetic layers in FIGS. 20A and 20B, the present embodiment is not limited thereto and the free layer 41 and the pinned layer 43 may be vertical magnetic layers.

Figure 21:
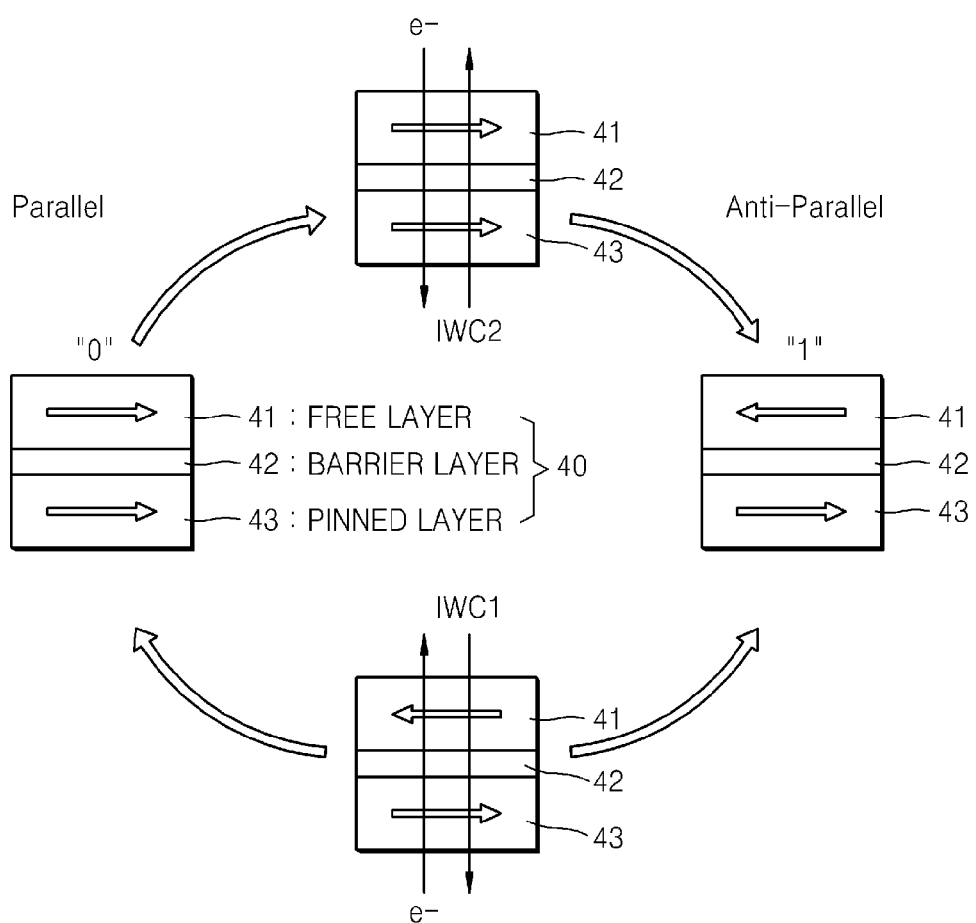
FIG. 21 is a block diagram for explaining a write operation of the STT-MRAM cell of FIG. 19, according to an embodiment of the inventive concept.

FIG. 21 is a block diagram for explaining a write operation of the STT-MRAM cell 30 of FIG. 19, according to an embodiment of the inventive concept.

Referring to FIG. 21, a magnetization direction of the free layer 43 may be determined according to a direction of write current IW that flows through the MTJ device 40. For example, when first write current IWC1 is applied from the free layer 41 to the pinned layer 43, free electrons having the same spin direction as that of the pinned layer 43 apply a torque to the free layer 41. Accordingly, the free layer 41 is magnetized to be parallel to the pinned layer 43.

When second write current IWC2 is applied from the pinned layer 43 to the free layer 41, electrons having the opposite spin direction to that of the pinned layer 41 return to the free layer 43 and apply a torque. Accordingly, the free layer 41 is magnetized to be anti-parallel to the pinned layer 43. That is, a magnetization direction of the free layer 41 of the MTJ device 40 may be changed according to a spin-transfer torque (STT).

Figure 22A:
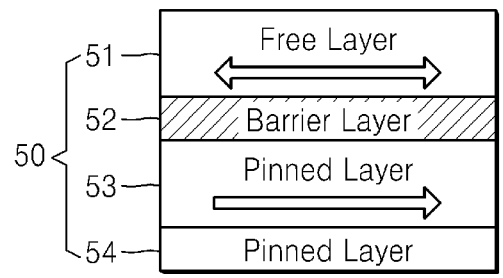
FIGS. 22A and 22B are block diagrams for explaining MTJ devices in the STT-MRAM cell of FIG. 19, according to other embodiments of the inventive concept.
Figure 22B:
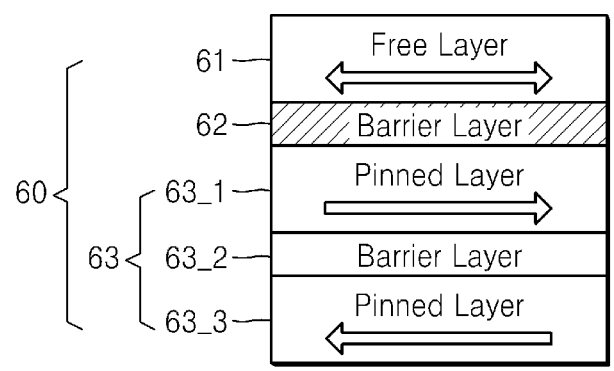

FIGS. 22A and 22B are block diagrams for explaining MTJ devices 50 and 60 in the STT-MRAM cell 30 of FIG. 19, according to other embodiments of the inventive concept.

Referring to FIG. 22A, the MTJ device 50 may include a free layer 51, a tunnel layer 52, a pinned layer 53, and an anti-ferromagnetic layer 54. The free layer 51 may include a material having a variable magnetization direction. A magnetization direction of the free layer 51 may be changed due to electrical/magnetic factors provided from the outside and/or inside of the STT-MRAM cell 30. The free layer 51 may include a ferromagnetic material including at least one of cobalt (Co), iron (Fe), and nickel (Ni). For example, the free layer 51 may include at least one selected from the group consisting of FeB, Fe, Co, Ni, Gd, Dy, CoFe, NiFe, MnAs, MnBi, MnSb, $CrO_2$, $MnOFe_2O_3$, $FeOFe_2O_3$, $NiOFe_2O_3$, $CuOFe_2O_3$, $MgOFe_2O_3$, EuO, and $Y_3Fe_5O_{12}$.

The tunnel layer 52 may have a thickness less than a spin diffusion distance. The tunnel layer 52 may include a nonmagnetic material. For example, the tunnel layer 52 may include at least one selected from the group consisting of magnesium (Mg), titanium (Ti), aluminum (Al), magnesium-zinc (MgZn), or magnesium-boron (MgB) oxide, and titanium (Ti) or vanadium (V) nitride.

The pinned layer 53 may have a magnetization direction that is fixed due to the anti-ferromagnetic layer 54. Also, the pinned layer 53 may include a ferromagnetic material. For example, the pinned layer 53 may include at least one selected from the group consisting of CoFeB, Fe, Co, Ni, Gd, Dy, CoFe, NiFe, MnAs, MnBi, MnSb, $CrO_2$, $MnOFe_2O_3$, $FeOFe_2O_3$, $NiOFe_2O_3$, $CuOFe_2O_3$, $MgOFe_2O_3$, EuO, and $Y_3Fe_5O_{12}$.

The anti-ferromagnetic layer 54 may include an anti-ferromagnetic material. For example, the anti-ferromagnetic layer 54 may include at least one selected from the group consisting of PtMn, IrMn, MnO, MnS, MnTe, $MnF_2$, $FeCl_2$, FeO, $CoCl_2$, CoO, $NiCl_2$, NiO, and Cr.

Since each of the free layer 51 and the pinned layer 53 of the MTJ device 50 is formed of a ferromagnetic material, a stray field may be generated on an edge of the ferromagnetic material. The stray field may reduce a magnetic resistance or may increase a coercive force of the free layer 51. In addition, the stray field may affect switching characteristics, thereby leading to asymmetric switching. Accordingly, a structure for reducing or controlling the stray field that is generated in the ferromagnetic material in the MTJ device 50 is necessary.

Referring to FIG. 22B, a pinned layer 63 of an MTJ device 60 may be formed of a synthetic anti-ferromagnetic (SAF) material. The pinned layer 63 may include a first ferromagnetic layer 63_1, a coupling layer 63_2, and a second ferromagnetic layer 63_3. Each of the first and second ferromagnetic layers 63_1 and 63_3 may include at least one selected from the group consisting of CoFeB, Fe, Co, Ni, Gd, Dy, CoFe, NiFe, MnAs, MnBi, MnSb, $CrO_2$, $MnOFe_2O_3$, $FeOFe_2O_3$, $NiOFe_2O_3$, $CuOFe_2O_3$, $MgOFe_2O_3$, EuO, and $Y_3Fe_5O_{12}$. In this case, a magnetization direction of the first ferromagnetic layer 63_1 and a magnetization direction of the second ferromagnetic layer 63_3 are different from each other and are fixed. The coupling layer 63_2 may include ruthenium (Ru).

Figure 23:
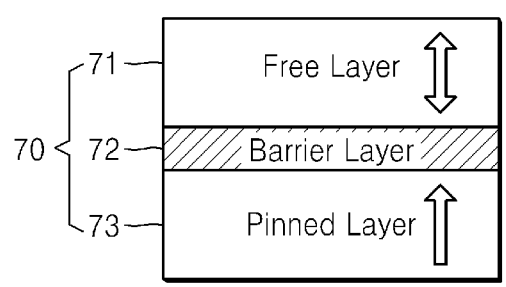
FIG. 23 is a block diagram for explaining an MTJ device in the STT-MRAM cell of FIG. 19, according to another embodiment of the inventive concept.

FIG. 23 is a block diagram for explaining an MTJ device 70 in the STT-MRAM cell 30 of FIG. 19, according to another embodiment of the inventive concept.

Referring to FIG. 23, the MTJ device 70 has a vertical magnetization direction, and a movement direction of current and a magnetization easy axis are substantially parallel to each other. The MTJ device 70 includes a free layer 71, a tunnel layer 72, and a pinned layer 73. When a magnetization direction of the free layer 71 and a magnetization direction of the pinned layer 73 are parallel to each other, a resistance value is reduced, and when a magnetization direction of the free layer 71 and a magnetization direction of the pinned layer 73 are anti-parallel to each other, a resistance value is increased. Data may be stored in the MTJ device 70 according to the resistance value.

In order to realize the MTJ device 70 having a vertical magnetization direction, it is preferable that each of the free layer 71 and the pinned layer 73 is formed of a material having high magnetic anisotropic energy. Examples of the material having high magnetic anisotropic energy include an amorphous rare earth element alloy, a multi-layer thin film such as (Co/Pt)n or (Fe/Pt)n, and an ordered lattice material having a L10 crystal structure. For example, the free layer 71 may be formed of an ordered alloy, and may include at least one of iron (Fe), cobalt (Co), nickel (Ni), palladium (Pa), and platinum (Pt). Also, the free layer 71 may include at least one of a Fe—Pt ally, a Fe—Pd alloy, a Co—Pd alloy, a Co—Pt alloy, a Fe—Ni—Pt alloy, a Co—Fe—Pt alloy, and a Co—Ni—Pt alloy. The alloys may be chemical-quantitatively expressed as, for example, $Fe_{50}Pt_{50}$, $Fe_{50}Pd_{50}$, $Co_{50}Pd_{50}$, $Co_{50}Pt_{50}$, $Fe_{30}Ni_{20}Pt_{50}$, $Co_{30}Fe_{20}Pt_{50}$, or $Co_{30}Ni_{20}Pt_{50}$.

The pinned layer 73 may be formed of an ordered alloy, and may include at least one of Fe, Co, Ni, Pa, and Pt. For example, the pinned layer 73 may include at least one of a Fe—Pt alloy, a Fe—Pd alloy, a Co—Pd alloy, a Co—Pt alloy, a Fe—Ni—Pt alloy, a Co—Fe—Pt ally, and a Co—Ni—Pt alloy. The alloys may be chemical-quantitatively expressed as, for example, $Fe_{50}Pt_{50}$, $Fe_{50}Pd_{50}$, $Co_{50}Pd_{50}$, $Co_{50}Pt_{50}$, $Fe_{30}Ni_{20}Pt_{50}$, $Co_{30}Fe_{20}Pt_{50}$, or $Co_{30}Ni_{20}Pt_{50}$.

Figure 24A:
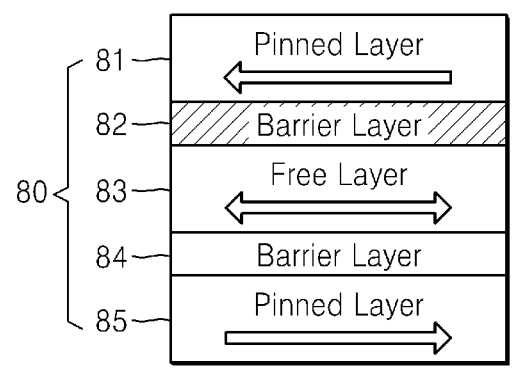
FIGS. 24A and 24B are block diagrams for explaining MTJ devices in the STT-MRAM cell of FIG. 19, according to other embodiments of the inventive concept.
Figure 24B:
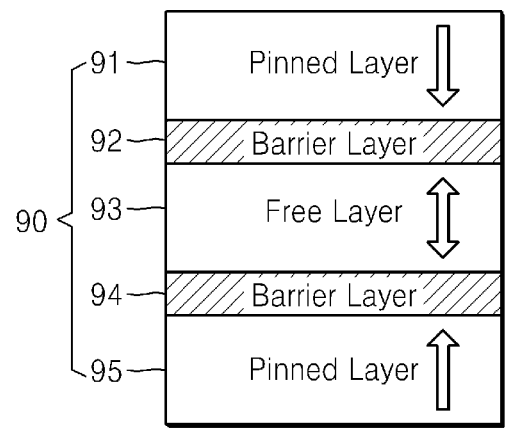

FIGS. 24A and 24B are block diagrams illustrating MT devices 80 and 90 in the STT-MRAM cell 30 of FIG. 19, according to other embodiments of the inventive concept. A dual MTJ device has a structure in which a tunnel layer and a pinned layer are disposed at both ends of a free layer.

Referring to FIG. 24, the MTJ device 80 that is a dual MTJ device having a horizontal magnetization direction may include a first pinned layer 81, a first tunnel layer 82, a free layer 83, a second tunnel layer 84, and a second pinned layer 85. A material of each of the first and second pinned layers 81 and 85 is similar to that of the pinned layer 53 of FIG. 22A, and a material of each of the first and second tunnel layers 82 and 84 is similar to that of the tunnel layer 52 of FIG. 22A, and a material of the free layer 83 is similar to that of the free layer 51 of FIG. 22A.

When a magnetization direction of the first pinned layer 81 and a magnetization direction of the second pinned layer 85 are fixed to be opposite, magnetic forces of the first and second pinned layers 81 and 85 are offset. Accordingly, the MTJ device 80 that is a dual MTJ device may perform a write operation by using less current than that of a typical MTJ device.

The MTJ device 80 provides greater resistance during a read operation due to the second tunnel layer 84, the MTJ device 80 may obtain a more accurate data value.

Referring to FIG. 24B, the MTJ device 90 that is a dual MTJ device having a vertical magnetization direction includes a first pinned layer 91, a first tunnel layer 92, a free layer 93, a second tunnel layer 94, and a second pinned layer 95. A material of each of the first and second pinned layers 91 and 95 is similar to that of the pinned layer 73 of FIG. 23, a material of each of the first and second tunnel layers 92 and 94 is similar to that of the tunnel layer 72 of FIG. 23, and a material of the free layer 93 is similar to that of the free layer 71 of FIG. 23.

In this case, when a magnetization direction of the first pinned layer 91 and a magnetization direction of the second pinned layer 95 are fixed to be opposite, magnetic forces of the first and second pinned layers 91 and 95 are actually offset. Accordingly, the MTJ device 90 that is a dual MTJ device may perform a write operation by using less current than that of a typical MTJ device.

The STT-MRAM may be used as a main memory of a system. Since the STT-MRAM may have byte-addressibility and may permanently retain data, data double copying for improving the reliability of a file system may be omitted. Also, since the STT-MRAM is used in micro journaling that writes and checks logging information during a file write operation, the file system may be recovered during system collision.

While the inventive concept has been particularly shown and described with reference to exemplary embodiments thereof, it will be understood that various changes in form and details may be made therein without departing from the spirit and scope of the following claims. Accordingly, the spirit and scope of the inventive concept is defined by the attached claims.

What is claimed is:

1. A nonvolatile memory mapping method comprising:
performing a system call in order to access a file page that is required to operate a process stored in a kernel area of a nonvolatile main memory, wherein both the file page and process are stored in the kernel area of the nonvolatile main memory; and
mapping a physical address of the file page to a virtual address of a user area of the nonvolatile main memory, wherein
the performing of the system call comprises performing a read/write system call, and
the mapping comprises mapping the physical address of the file page to a virtual address of a library buffer in a space of the user area,
wherein the nonvolatile memory mapping method further comprises copying the file page to a user buffer in a space of the user area.

2. The nonvolatile memory mapping method of claim 1, wherein the mapping comprises, when a sequential access command is generated in the file page that is stored in the nonvolatile main memory, increasing a size of the file page to be mapped.

3. The nonvolatile memory mapping method of claim 2, wherein the mapping comprises, when a random access command is generated in the file page that is stored in the nonvolatile main memory, initializing the size of the file page to be mapped.

4. The nonvolatile memory mapping method of claim 1, further comprising populating the file page that is necessary for mapping into a space of the kernel area of the nonvolatile main memory, wherein the populating is performed by a swap device that is provided in a secondary storage apparatus.

5. The nonvolatile memory mapping method of claim 4, wherein the populating comprises:
detecting a file offset that is required to operate the process;
selecting a file page that is required to be populated with a first priority into a space of the kernel area of the nonvolatile main memory based on the detected file offset; and
selectively populating the required file page with the first priority.

6. The nonvolatile memory mapping method of claim 5, wherein the selecting of the required file page further comprises:
selecting a file page that is required to be populated with a next priority into a space of the kernel area of the nonvolatile main memory based on the detected file offset; and
populating the required file page with the next priority in asynchronization with the selective populating.

7. The nonvolatile memory mapping method of claim 1, further comprising:
receiving, from a nonvolatile memory system, mapping table information that is updated by a processor; and
updating a mapping table in a translation lookaside buffer (TLB) based on the updated mapping table information, wherein the updating is performed by the processor.

8. The nonvolatile memory mapping method of claim 1, wherein the mapping comprises:
before allocating a virtual area to the nonvolatile main memory, detecting characteristics of the virtual area;
determining whether the virtual area that is already allocated is to be re-used based on the detected characteristics; and
when it is determined that the virtual area may be re-used, storing a memory virtual address of a file system or the process in the virtual area.

9. The nonvolatile memory mapping method of claim 1, wherein the mapping comprises:
detecting a file offset in a file write step;
determining whether a file page is to be newly allocated based on a result of the detecting the file offset;
connecting the newly allocated file page to an existing file; and
mapping the newly allocated file page to a virtual area.

10. A system comprising:
a nonvolatile main memory comprising a file system in a kernel area of the nonvolatile main memory;
a secondary storage apparatus comprising a swap device in which a file page is stored; and
a processor comprising a population control unit that controls a file page to be populated, the file page being necessary to operate a process,
wherein the processor comprises a translation lookaside buffer (TLB) management unit that receives updated mapping table information from a nonvolatile memory system and updates a mapping table in a TLB based on the updated mapping table information, and
wherein the population control unit is configured to detect a file offset that is necessary to operate a program and selectively populates a file page whose offset has a first priority.

11. The system of claim 10, wherein the nonvolatile main memory comprises any one of a spin-transfer torque magnetoresistive random-access memory (STT-MRAM), a resistance random-access memory (ReRAM), a magnetoresistive random-access memory (MRAM), and a ferroelectric random-access memory (FeRAM).

12. The system of claim 10, wherein the population control unit detects the file offset that is necessary to operate the program and controls a file page whose offset has a next priority to be populated in asynchronization with the selective populating.

13. A nonvolatile memory mapping method comprising:
performing a system call in order to access a file page that is used to operate a process stored in a kernel area of a nonvolatile main memory, wherein both the file page and process are stored in the kernel area of the nonvolatile main memory;
mapping a physical address of the file page to a virtual address of a user area of the nonvolatile main memory;
receiving, from a nonvolatile memory system, mapping table information that is updated by a processor; and
updating a mapping table in a translation lookaside buffer (TLB) based on the updated mapping table information, wherein the updating is performed by the processor, wherein
the performing of the system call comprises performing a read/write system call, and the mapping comprises mapping the physical address of the file page to a virtual address of a library buffer in a space of the user area, wherein the nonvolatile memory mapping method further comprises copying the file page to a user buffer in a space of the user area.

14. The nonvolatile memory mapping method of claim 13, further comprising populating the file page, which is used for mapping into a space of the kernel area of the nonvolatile main memory, wherein the populating is performed by a swap device that is provided in a secondary storage apparatus.

15. The nonvolatile memory mapping method of claim 14, wherein the populating comprises:

detecting a file offset that is used to operate the process;

selecting a file page to be populated with a first priority into a space of the kernel area of the nonvolatile main memory based on the detected file offset; and selectively populating the file page with the first priority.

16. The nonvolatile memory mapping method of claim 15, wherein the selecting of the file page further comprises:

selecting a file page that is required to be populated with a next priority into a space of the kernel area of the nonvolatile main memory based on the detected file offset; and populating the required file page with the next priority in asynchronization with the selective populating.

\* \* \* \* \*